United States Patent
Uwatoko

(10) Patent No.: US 8,400,693 B2
(45) Date of Patent: Mar. 19, 2013

(54) IMAGE DEFECT DIAGNOSTIC SYSTEM, IMAGE FORMING APPARATUS, IMAGE DEFECT DIAGNOSTIC METHOD AND COMPUTER READABLE MEDIUM

(75) Inventor: Koki Uwatoko, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 570 days.

(21) Appl. No.: 12/726,991

(22) Filed: Mar. 18, 2010

(65) Prior Publication Data
US 2011/0019244 A1 Jan. 27, 2011

(30) Foreign Application Priority Data
Jul. 22, 2009 (JP) .................................. 2009-171656

(51) Int. Cl.
*H04N 1/46* (2006.01)
(52) U.S. Cl. ....... 358/504; 358/1.9; 358/1.13; 358/1.14; 358/448; 382/112; 382/117; 382/131; 382/274; 382/275
(58) Field of Classification Search ........................ None
See application file for complete search history.

(56) References Cited

U.S. PATENT DOCUMENTS

| | | | | |
|---|---|---|---|---|
| 6,332,665 B1 * | 12/2001 | Mantell et al. ................... 347/37 | | |
| 7,239,738 B2 * | 7/2007 | Yasukawa et al. ............ 382/141 | | |
| 8,106,976 B2 * | 1/2012 | Kawasaka ..................... 348/251 | | |
| 2003/0012453 A1 * | 1/2003 | Kotlikov et al. ............... 382/275 | | |
| 2006/0274170 A1 * | 12/2006 | Azuma ......................... 348/246 | | |

FOREIGN PATENT DOCUMENTS

| | | |
|---|---|---|
| JP | A-7-134014 | 5/1995 |
| JP | A-2002-283681 | 10/2002 |
| JP | A-2005-227142 | 8/2005 |

* cited by examiner

*Primary Examiner* — Dung Tran
(74) *Attorney, Agent, or Firm* — Oliff & Berridge, PLC

(57) ABSTRACT

An image defect diagnostic system includes: an acquiring unit acquiring image data for a test target image; an image defect detecting unit detecting image defects in the test target image; a coordinate conversion processor performing coordinate conversion processing to convert position coordinate information on the image defects into position coordinate information in each rotated coordinate system by every predetermined angle by using a coordinate point in the test target image as rotation center coordinates; an occurrence state detecting unit detecting an occurrence state of the image defects in each rotated coordinate system by using the position coordinate information; a setting unit setting a coordinate rotation angle for the coordinate conversion processing on the basis of the occurrence state; and a feature amount extracting unit extracting a feature amount characterizing the image defects, by using the position coordinate information in a coordinate system rotated by the coordinate rotation angle.

16 Claims, 19 Drawing Sheets

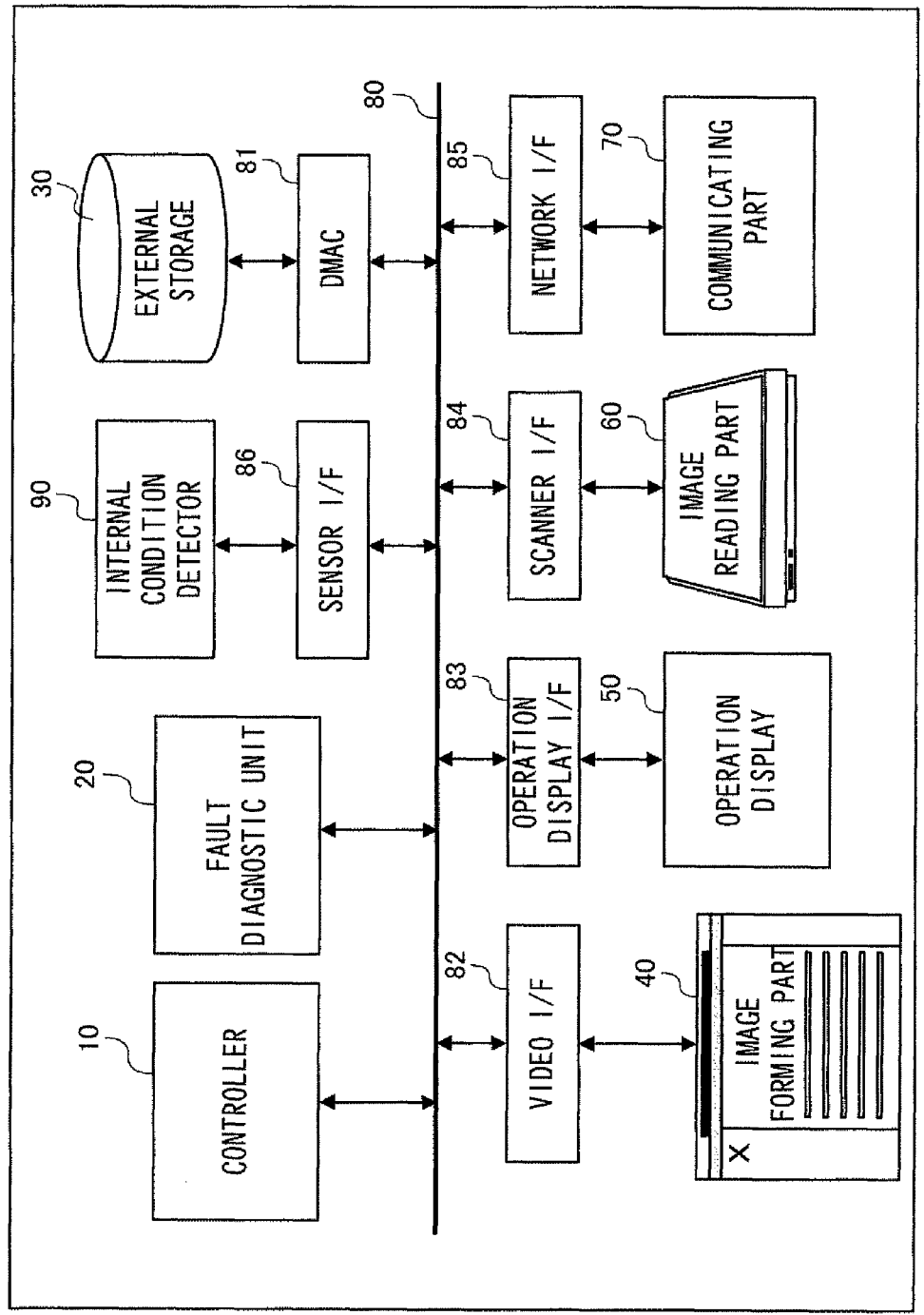

FIG.7

DISPLAY SCREEN

PLEASE SELECT A DIAGNOSIS RESULT

| ESTIMATED FAULT CAUSES AND FAULT PARTS | FAULT PROBABILITY | OPERATION DIFFICULTY LEVELS |
|---|---|---|
| ☐ STAIN ON PLATEN GLASS | 98.5% | LEVEL 1 |
| ☐ LIGHT-UP ERROR OF PHOTORECEPTOR GHOST ELIMINATION LAMP | 0.2% | LEVEL 2 |
| ☐ WIRING SUBSTRATE ERROR OF SCANNER / IMAGE FORMING PART | 0.2% | LEVEL 3 |
| ☐ PAGE MEMORY ERROR | 0.1% | LEVEL 3 |

[ OK ]   [ RETURN ]   [ CANCEL ]

IMAGE DEFECT DIAGNOSTIC SYSTEM, IMAGE FORMING APPARATUS, IMAGE DEFECT DIAGNOSTIC METHOD AND COMPUTER READABLE MEDIUM

CROSS REFERENCE TO RELATED APPLICATIONS

This application is based on and claims priority under 35 USC §119 from Japanese Patent Application No. 2009-171656 filed Jul. 22, 2009.

BACKGROUND

1. Technical Field

The present invention relates to an image defect diagnostic system, an image forming apparatus, an image defect diagnostic method and a computer readable medium storing a program.

2. Related Art

There has been known a technique in which an image forming apparatus such as a copy machine, a printer or the like estimates a fault part. Specifically, in the image forming apparatus, a test target image such as a test chart image or the like printed by itself is read by an image reading apparatus, and image defects are diagnosed on the basis of the read image data of the test target image, and then the fault part of the image forming apparatus is estimated on the basis of the occurrence state of the image defects.

SUMMARY

According to an aspect of the present invention, there is provided an image defect diagnostic system including: an acquiring unit that acquires image data generated by reading a test target image to be tested for an image defect; an image defect detecting unit that detects image defects occurring in the test target image, from the image data acquired by the acquiring unit; a coordinate conversion processor that performs coordinate conversion processing to convert position coordinate information on the image defects detected by the image defect detecting unit into position coordinate information on the image defects in each coordinate system obtained by rotating a coordinate system for the test target image by every predetermined angle by using a coordinate point set in advance in the test target image as rotation center coordinates, the position coordinate information being information on position coordinates in the test target image; an occurrence state detecting unit that detects an occurrence state of the image defects in each coordinate system, by using the position coordinate information in each coordinate system obtained by rotating the coordinate system for the test target image by every predetermined angle in the coordinate conversion processing performed by the coordinate conversion processor; a setting unit that sets a coordinate rotation angle for the coordinate conversion processing to be performed on the position coordinate information on the image defects, on the basis of the occurrence state of the image defects detected in each coordinate system by the occurrence state detecting unit; and a feature amount extracting unit that extracts a feature amount characterizing the image defects, by using the position coordinate information in a coordinate system obtained by rotating the coordinate system for the test target image by the coordinate rotation angle set by the setting unit.

BRIEF DESCRIPTION OF THE DRAWINGS

Exemplary embodiment(s) of the present invention will be described in detail based on the following figures, wherein:

FIG. 1 is a block diagram showing an example of a configuration of an entire image forming apparatus to which the exemplary embodiment is applied;

FIG. 7 is a view showing an example of a display screen for a diagnosis result displayed on the operation display;

FIGS. 13-1 and 13-2 are flowcharts for explaining an example of the fault diagnosis processing performed by the fault diagnostic unit;

FIGS. 17-1 and 17-2 are flowcharts for explaining an example of the fault diagnosis processing performed by the fault diagnostic unit.

DETAILED DESCRIPTION

Exemplary embodiments of the present invention will be described below in detail with reference to the accompanying drawings.

<Description of Image Forming Apparatus>

Figures 1, 13:
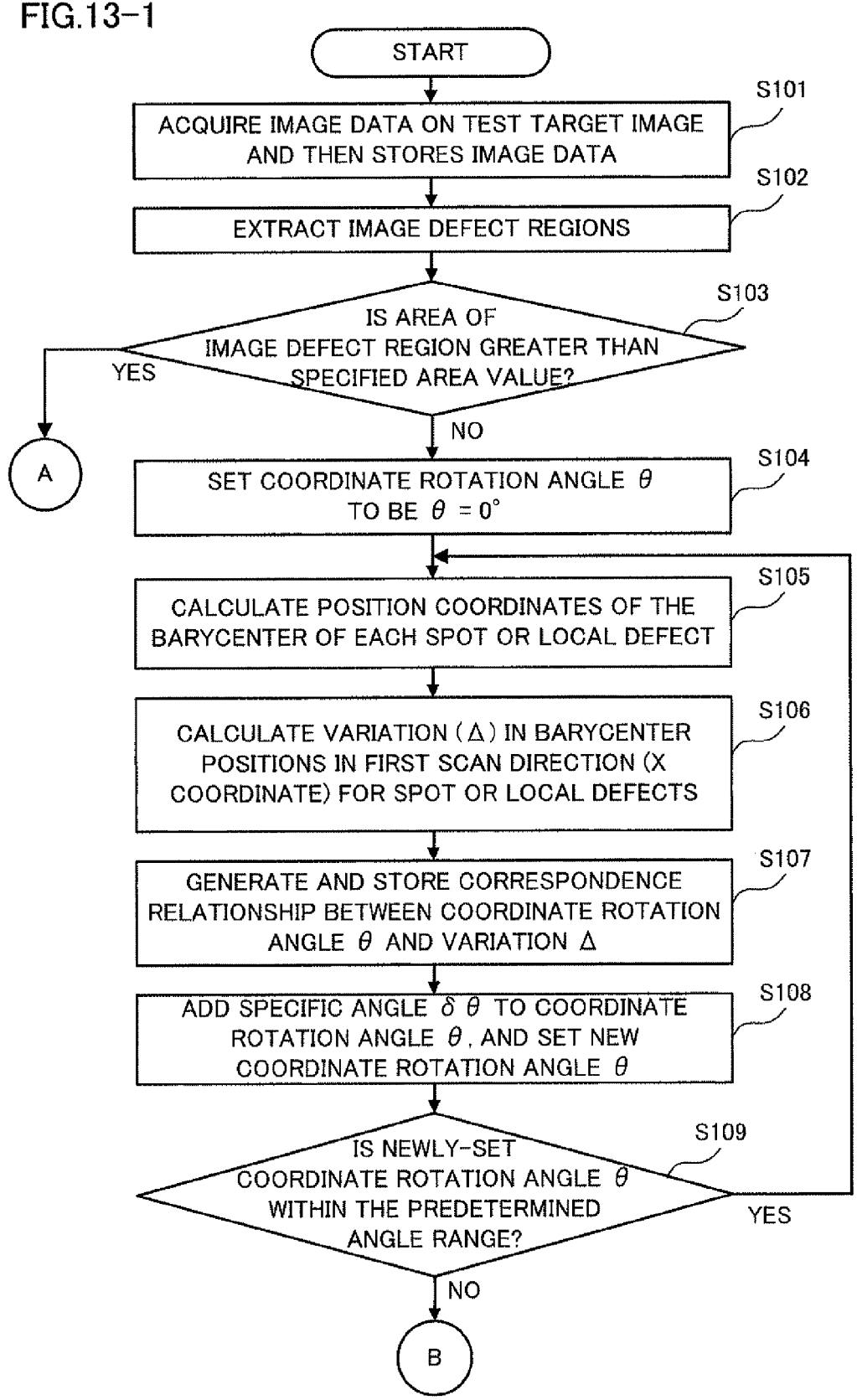
Figures 2, 13:
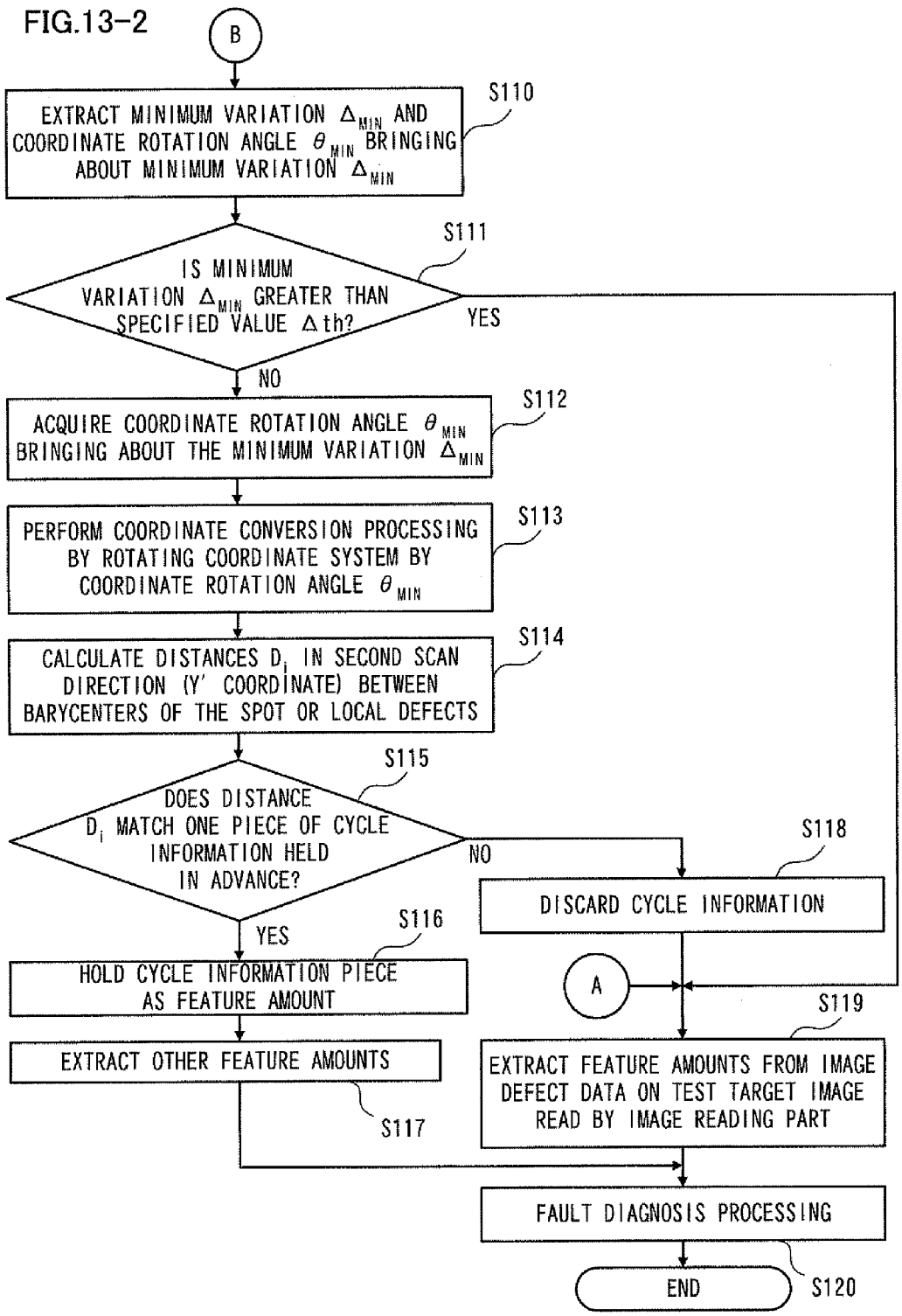

FIG. 1 is a block diagram showing an example of a configuration of an entire image forming apparatus 1 to which the exemplary embodiment is applied. The image forming apparatus 1 shown in FIG. 1 includes a controller 10, a fault diagnostic unit 20 and an external storage 30. The controller 10 controls entire operation of the image forming apparatus 1. The fault diagnostic unit 20 is an example of an image defect diagnostic unit that diagnoses a fault of the image forming apparatus 1 on the basis of an image defect occurring in an image. The external storage 30 is formed of a hard disk drive (HDD), a flash memory or the like, for example, and stores various kinds of programs, data and the like.

The image forming apparatus 1 further includes an image forming part 40, an operation display 50, an image reading part 60 and a communicating part 70. The image forming part 40 is an example of an image forming unit that forms an image on a recording medium (sheet) on the basis of image data (video data). The operation display 50 receives an operation input from a user, and displays various kinds of information to the user. The image reading part 60 is an example of an image reading unit that reads the reflectance of each color component from an original image, and thereby generates image data. The communicating part 70 communicates with a communication unit (network) such as a local area network (LAN), a wide area network (WAN) or the Internet. Here, as the image forming part 40, an electrophotographic image forming engine is used, for example.

Moreover, the image forming apparatus 1 includes an internal condition detector 90. The internal condition detector 90 detects various kinds of information indicating internal conditions of the image forming apparatus 1 (hereinafter called "internal condition information") such as a temperature and a humidity inside the image forming apparatus 1, a time at which a sheet transported by the image forming part 40 passes a sheet transportation path, a drive current used in the image forming apparatus 1, and the like.

Furthermore, the image forming apparatus 1 includes a direct memory access controller (DMAC) 81, a video interface (I/F) 82, an operation display interface (I/F) 83, a scanner interface (I/F) 84, a network interface (I/F) 85 and a sensor interface (I/F) 86. The DMAC 81 performs data transfer to and from the external storage 30 at a high speed. The video I/F 82 controls video data transmission and reception to and from the image forming part 40. The operation display I/F 83 controls data transmission and reception to and from the operation display 50. The scanner I/F 84 controls image data transmission and reception to and from the image reading part 60. The network I/F 85 controls data transmission and reception to and from the communicating part 70. The sensor I/F 86 controls data transmission and reception to and from the internal condition detector 90.

The controller 10, the fault diagnostic unit 20, the video I/F 82, the operation display I/F 83, the scanner I/F 84, the network I/F 85 and the sensor I/F 86 are connected to a peripheral components interconnect (PCI) bus 80.

Moreover, the external storage 30 is connected to the PCI bus 80 through the DMAC 81, and performs high-speed data transfer to and from the controller 10 and various interfaces (I/Fs) connected to the PCI bus 80.

Here, the fault diagnostic unit 20 may be formed integrally with the controller 10, the image forming part 40, the image reading part 60 and the like, or may be formed separately therefrom. When being formed separately, the fault diagnostic unit 20 is connected to the controller 10, the image forming part 40, the image reading part 60 and the like through the communicating part 70 by a network such as a LAN, a WAN or the Internet, for example. In this way, a fault diagnostic system including the fault diagnostic unit 20 outside the image forming apparatus 1 is formed. A communication line forming the network may be a telephone line, a satellite communication line (a space transmission path in digital satellite broadcasting, for example) or the like.

<Description of Fault Diagnostic Unit>

Figure 2:
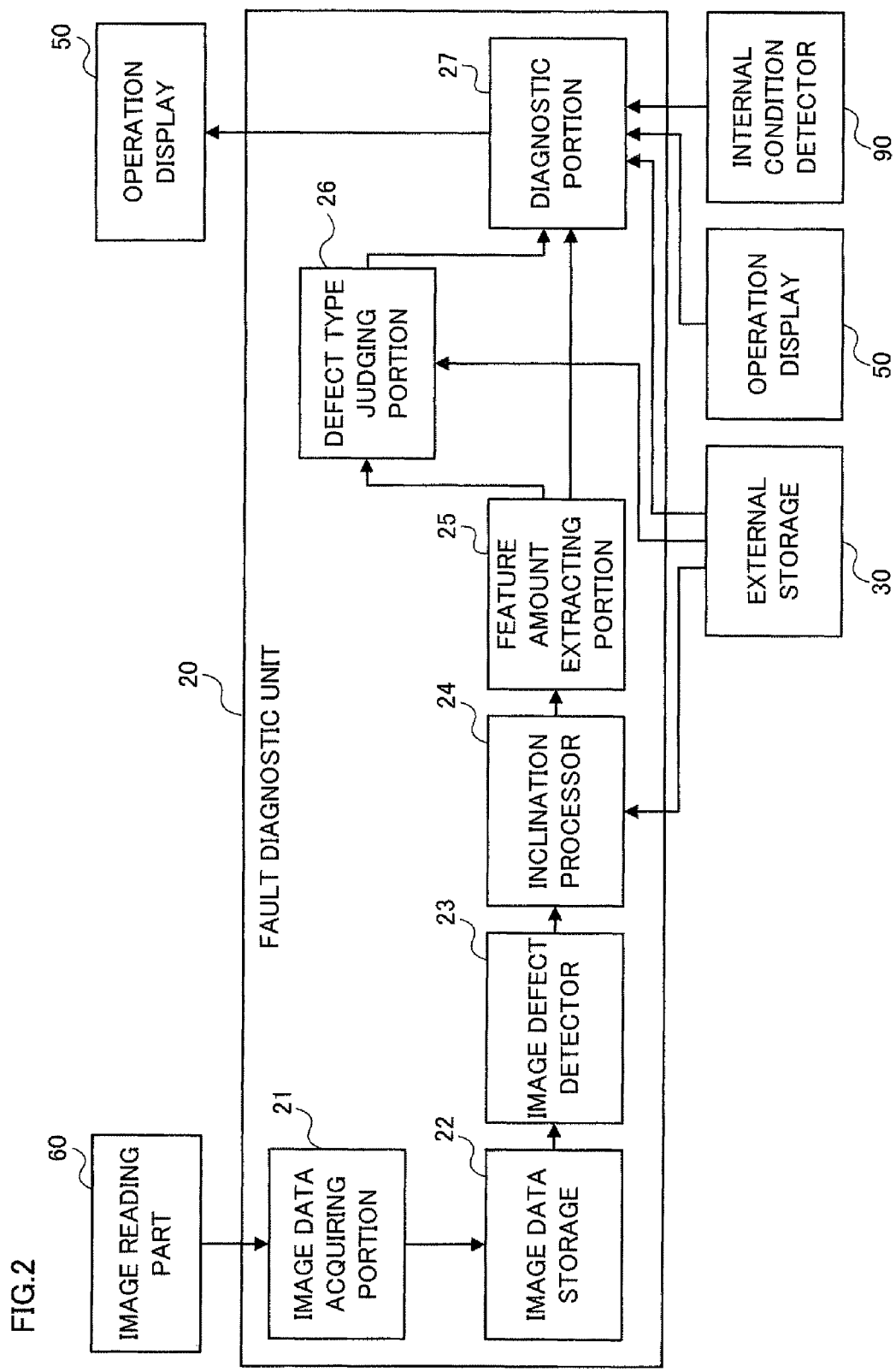
FIG. 2 is a block diagram showing a configuration of the fault diagnostic unit.

FIG. 2 is a block diagram showing a configuration of the fault diagnostic unit 20.

As shown in FIG. 2, the fault diagnostic unit 20 includes an image data acquiring portion 21, an image data storage 22, an image defect detector 23, an inclination processor 24, a feature amount extracting portion 25, a defect type judging portion 26 and a diagnostic portion 27. The image data acquiring portion 21 is an example of an acquiring unit that acquires the image data generated by the image reading part 60. The image data storage 22 stores the image data acquired by the image data acquiring portion 21. The image defect detector 23 is an example of an image defect detecting unit that detects each region, having an image defect, of an image (hereinafter called a "defect region"). The inclination processor 24 judges whether or not the image defects have periodicity, in consideration of the inclination of the image. The feature amount extracting portion 25 is an example of a feature amount extracting unit that extracts feature amounts of the image defects from the defect regions of the image. The defect type judging portion 26 judges the types of the image defects occurring in the image. The diagnostic portion 27 diagnoses a fault cause bringing about the image defects, by using information on the types of the image defects occurring in the image, the feature amounts of the image defects extracted from the defect regions, and the like.

<Description of Acquiring Image Data to be Used for Fault Diagnosis by Fault Diagnostic Unit>

The image data acquiring portion 21 acquires image data on a test target image (hereinafter called a "test chart image") selected by a user (a user, an administrator or the like of the image forming apparatus 1, for example) operating the operation display 50. This test chart image is selected by the user making a selection on the operation display 50 on the basis of defect occurrence conditions such as an occurrence state of each image defect to be diagnosed and a color with which each image defect is occurring.

Figure 3:
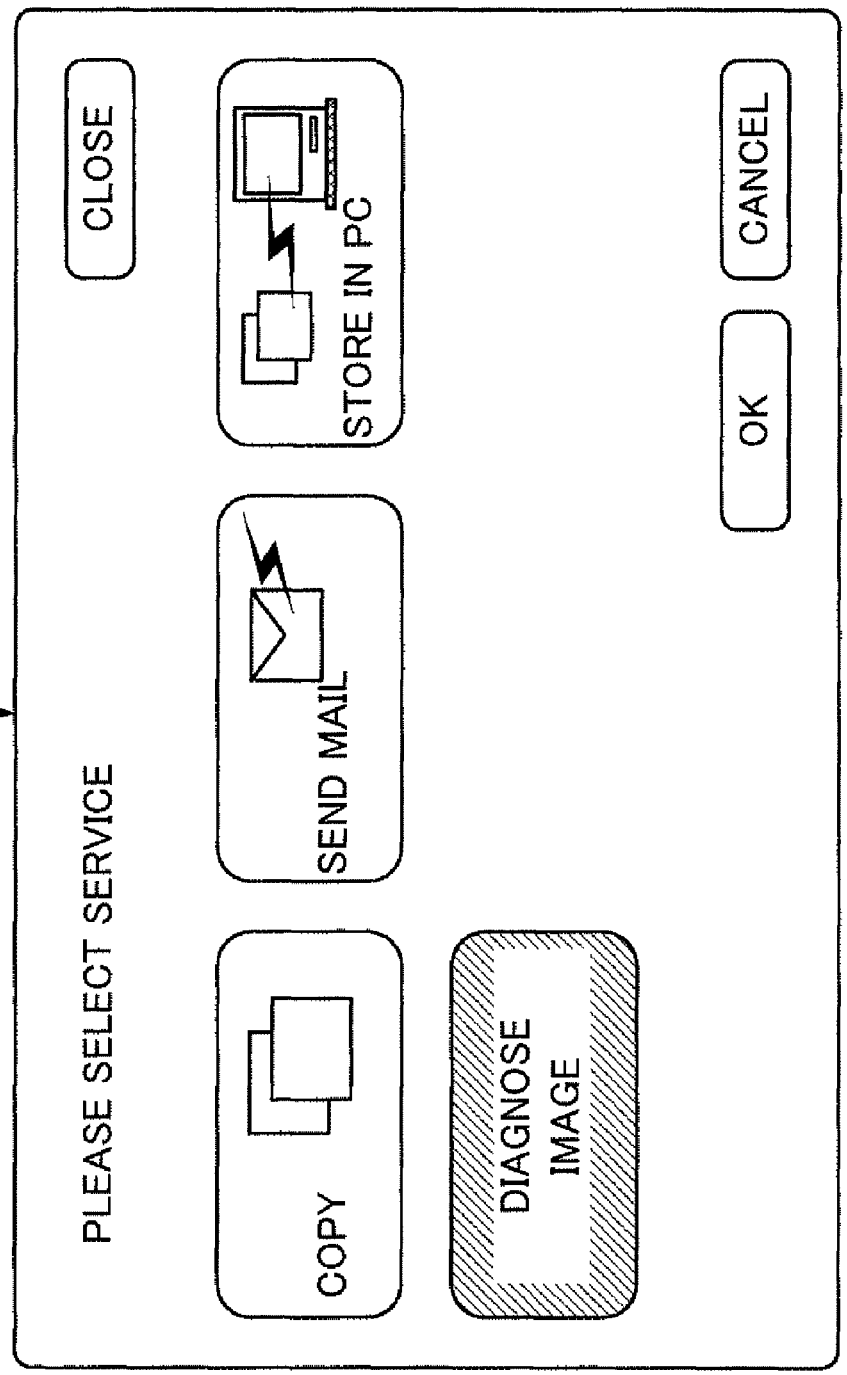
FIG. 3 is a view showing an example of the display screen for the contents of service displayed by the operation display.

Specifically, for example, when a main switch (not shown) of the image forming apparatus 1 is turned on, the controller 10 transmits, to the operation display 50 through the operation display I/F 83, a control signal for instructing the operation display 50 to display the contents of service to be provided to the user. Upon receipt of the signal, the operation display 50 displays a display screen showing the contents of service to be provided to the user by the image forming apparatus 1, as shown in FIG. 3 (which is a view showing an example of the display screen for the contents of service displayed by the operation display 50). In this display screen, displayed is, for example, a screen including: "copy" for executing a copy function; "send mail" for executing a function of sending a mail; "store in PC" for executing a function of storing, in a personal computer (PC), the image data read by the image reading part 60; and "diagnose image" for executing a function of diagnosing a fault cause bringing about the image defects. Additionally, the operation display 50 also displays an instruction comment for instructing the user to select any of these functions.

Figure 4:
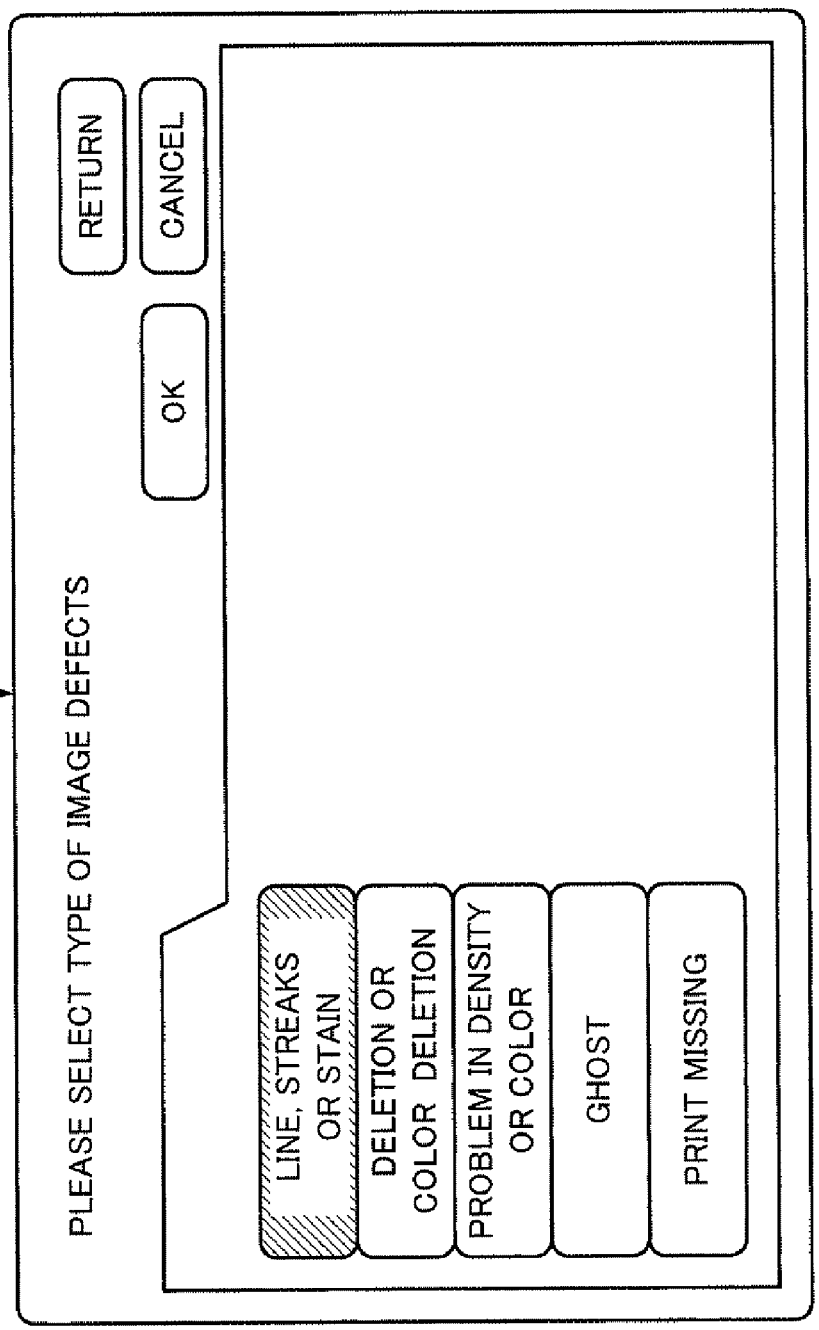
FIG. 4 is a view showing an example of the display screen for types of image defects displayed by the operation display.

When execution of "diagnose image" is selected by an operation input made by the user on the operation display 50, the controller 10 transmits, to the operation display 50 through the operation display I/F 83, a control signal for instructing the operation display 50 to display types of image defects to be diagnosed. Upon receipt of the signal, the operation display 50 displays types of image defects as shown in FIG. 4 (which is a view showing an example of the display screen for types of image defects displayed by the operation display 50). Here, displayed is, for example, a screen including, as types of image defects: "line, streaks or stain" indicating a linear stain, a streak stain or a stain in another shape appearing on an image; "deletion or color deletion" indicating missing of images with all color components or images with some of the color components; "problem in density or color" indicating a problem in image density or color; "ghost" indicating a problem that a copy of a prior image is additionally printed in an overlapping manner downstream of a sheet in a sheet transportation direction; and "print missing" indicating a problem that no image is printed on a sheet. Additionally, the operation display 50 also displays an instruction comment for instructing the user to select any of these types of image defects.

Figure 5:
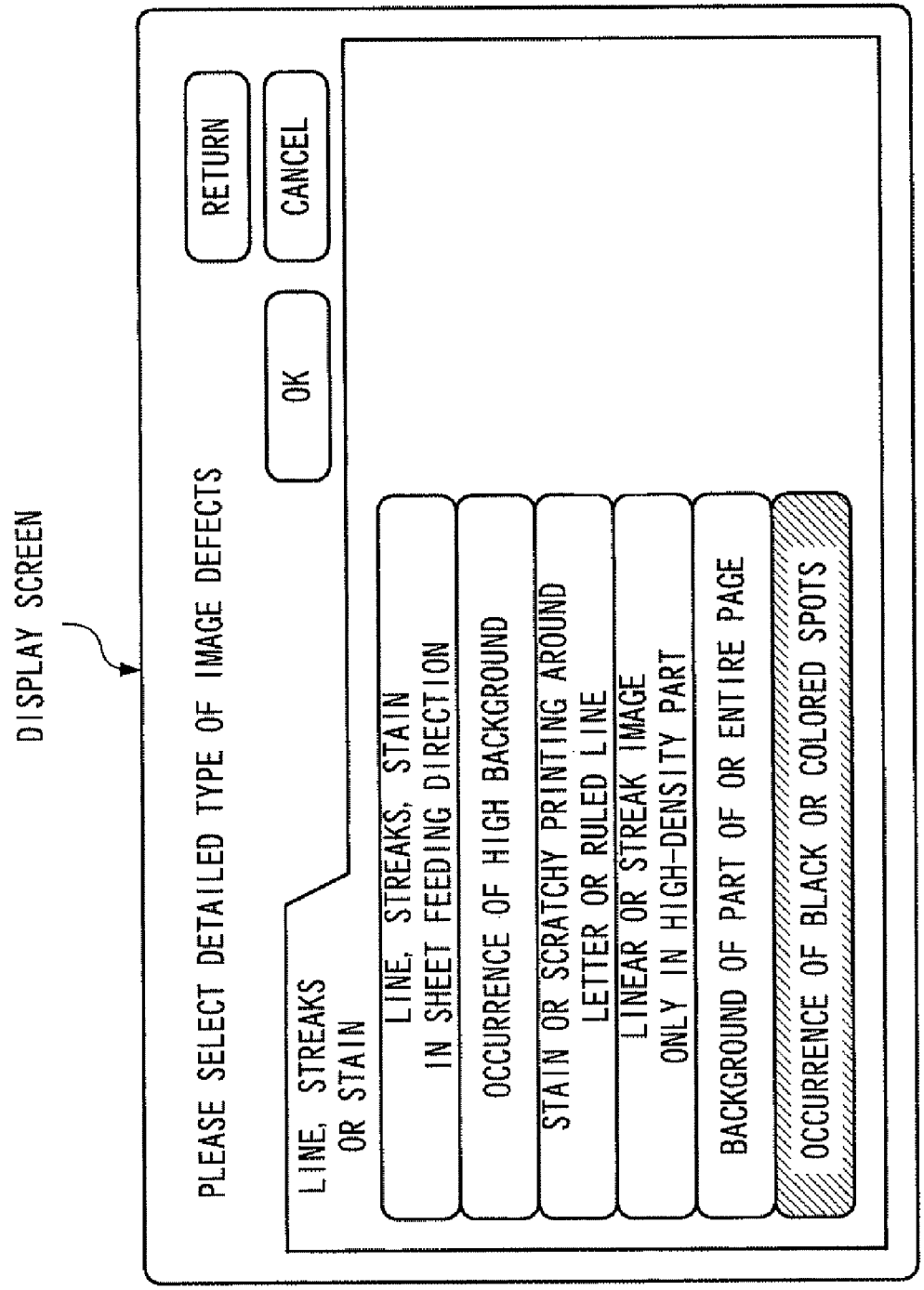
FIG. 5 is a view showing an example of the display screen for the detailed types of image defects displayed by the operation display.

Here, assume, for example, that "line, streaks or stain" (the hatched field in FIG. 4) is selected by an operation input made by the user on the operation display 50. Upon receipt of the input, the controller 10 transmits, to the operation display 50 through the operation display I/F 83, a control signal for instructing the operation display 50 to display further detailed types of image defects related to the image defect type "line, streaks or stain". Upon receipt of the signal, the operation display 50 displays detailed types of image defects related to "line, streaks or stain" as shown in FIG. 5 (which is a view showing an example of the display screen for the detailed types of image defects displayed by the operation display 50). Here, displayed is, for example, a display screen including, as the detailed types of image defects: "line, streaks, stain in sheet feeding direction" indicating a linear or streak stain appearing in the sheet transportation direction on an image; "occurrence of high background" indicating a slight stain (so-called "high background") spreading over an entire image; "stain or scratchy printing around letter or ruled line" indicating a stain or scratchy printing occurring around a letter, a ruled line or the like as if toner is scattered; "linear or streak image only in high-density part" indicating a linear or streak stain occurring only in a high-density region of an image; "background of part of or entire page" indicating a problem that part of a sheet or the entire sheet is filled in; and "occurrence of black or colored spots" indicating spots in a color component (primary color) (black spots or colored spots) occurring in a blank region of a sheet. Additionally, the operation display 50 also displays an instruction comment for instructing the user to select any of the detailed types of image defects.

Here, assume, for example, that "occurrence of black or colored spots" (the hatched field in FIG. 5), which is one of the detailed types of image defects, is selected by an operation input made by the user on the operation display 50. In this case, the controller 10 selects a test chart image to be used for diagnosing the defects in terms of "occurrence of black or colored spots." Then, the controller 10 transmits, to the image forming part 40 through the video I/F 82, a control signal for instructing the image forming part 40 to print the selected test chart image. Upon receipt of the signal, the image forming part 40 prints the test chart image instructed by the controller 10 to print. Here, for the printing of the test chart image, a color component (yellow (Y), magenta (M), cyan (C) or black (K)) to be used for the printing is also specified by the user on the basis of the occurrence state of image defects. For example, when the black (K) color is specified, the test chart image with the black (K) color is printed.

Moreover, the controller 10 transmits, to the operation display 50 through the operation display I/F 83, a control signal for instructing the operation display 50 to display an instruction for instructing the user to operate the image reading part 60 to read the printed test chart image. Upon receipt of the signal, the operation display 50 displays an instruction comment for instructing the user to operate the image reading part 60 to read the printed test chart image.

When the test chart image is read by the image reading part 60, the controller 10 causes the image reading part 60 to transfer image data on the reflectance of the test chart image, to the fault diagnostic unit 20 (image data acquiring portion 21).

In this way, the image data acquiring portion 21 of the fault diagnostic unit 20 acquires the image data on the test chart image. The image data on the test chart image acquired by the image data acquiring portion 21 is transferred to and then stored in the image data storage 22.

<Description of Image Defect Detector>

The image defect detector 23 acquires, from the image data storage 22, the image data on the test target image (test chart image) selected by the user on the basis of the occurrence state of image defects. In addition, the image defect detector 23 acquires, from the external storage 30, reference image data which serves as a reference in judging whether or not the test chart image formed by the image forming part 40 includes any image defect. This reference image data is reference data for forming the test chart image. Thereby, the image defect detector 23 determines each region including an image defect by comparing the image data on the test chart image and the reference image data acquired from the external storage 30. Then, the image defect detector 23 extracts "image defect data" associating the image data on the region determined as a region including an image defect with information on position coordinates on the test chart image (position coordinate data), and then outputs the extracted image defect data to the inclination processor 24.

Alternatively, in determining a region including an image defect, the image defect detector 23 may employ a method of comparing the image data on the test chart image and a predetermined density threshold.

<Description of Inclination Processor>

In general, for example, if transportation of a sheet is unstable when the image forming apparatus 1 (image forming part 40) forms a test chart image on the sheet, the test chart image may be formed in an inclined manner on the sheet in some cases. Moreover, when the image reading part 60 reads a test chart image, an inclination may occur between a reading reference position at which an image reading sensor (not shown) provided to the image reading part 60 reads the test chart image and the test chart image disposed on a platen glass (not shown) of the image reading part 60, in some cases. In these cases, the image reading part 60 reads the entire test chart image in an inclined manner, and may not be able to accurately extract a feature amount of an image defect in the test chart image, especially a feature amount of the periodicity of the image defect.

To avoid such situation, the inclination processor 24 judges whether or not the test chart image read by the image reading part 60 is inclined, on the basis of judgment condition information stored in the external storage 30. When judging that the test chart image is inclined, the inclination processor 24 corrects the inclination and then outputs the corrected test chart image to the feature amount extracting portion 25. Moreover, the inclination processor 24 corrects the inclination and then judges whether or not the image defects have a periodicity. When judging that the image defects have a periodicity, the inclination processor 24 extracts the feature amount of the periodicity of the image defects, and then outputs the feature amount to the feature amount extracting portion 25.

Specifically, the inclination processor 24 determines an occurrence state of the image defects in the test chart image, on the basis of the image defect data acquired from the image defect detector 23. Then, from the occurrence state of the image defects, the inclination processor 24 judges whether or not the image data acquired from the image data storage 22 is read in an inclined state. When judging that the image data on the test chart image is read in a state of being inclined by a predetermined angle or more, the inclination processor 24 performs inclination correction processing corresponding to the inclination angle of the test chart image on the image defect data acquired from the image defect detector 23, and then outputs the corrected image defect data to the feature amount extracting portion 25. Moreover, the inclination processor 24 judges whether or not the image defect data has a periodicity, in consideration of the inclination angle of the test chart image. When judging that the image defect data has a periodicity, the inclination processor 24 calculates a cycle of the image defect, and then outputs the calculated cycle as a feature amount of the cycle of the image defects to the feature amount extracting portion 25.

When the area of a region judged as including an image defect on the basis of the image defect data is smaller than a predetermined area, or when the inclination processor 24 judges that the inclination angle of the entire test chart image printed on the sheet is smaller than the predetermined angle, the inclination processor 24 outputs, to the feature amount extracting portion 25, the image defect data acquired from the image defect detector 23 without performing any processing thereon.

A configuration of the inclination processor 24 and contents of processing performed by the inclination processor 24 will be described later in detail.

<Description of Feature Amount Extracting Portion>

Subsequently, the feature amount extracting portion 25 extracts various feature amounts characterizing the image defects, on the basis of the image defect data and the feature amount of the cycle of the image defects acquired from the inclination processor 24. The feature amount extracting portion 25 extracts, for example, feature amounts such as the shape, size, tone density value, profile state, image-defect occurrence direction and position of the region including each image defect, and the feature amount of the cycle of the image defects acquired from the inclination processor 24.

For example, assume that the test chart image includes image defects in which black lines occur, and that it is judged, on the basis of the image defect data acquired from the inclination processor 24, that the color component with which the image defects occur is the black (K) color. In this case, the feature amount extracting portion 25 calculates, as feature amounts, the widths, lengths, contrasts and periodicity of the black lines, for example.

Then, the feature amount extracting portion 25 outputs information on the calculated feature amounts, to the defect type judging portion 26 and the diagnostic portion 27.

<Description of Defect Type Judging Portion>

The defect type judging portion 26 performs clustering processing for classifying image defect data having similarities in image defect type into groups of data, on the basis of the feature amounts acquired from the feature amount extracting portion 25 and characterizing the image defects. For the clustering processing, any one of existing algorithms such as k-means clustering and various kinds of hierarchical clustering is used.

The image defect types under which the image defect data are classified by the clustering processing include, for example, "line or streaks in sheet feeding direction (second scan direction)," "high background," "stain or scratchy printing around letter or ruled line," "line or streaks in high-density part," "background of part of or entire page," "black or colored spots" and the like.

Moreover, the defect type judging portion 26 selects an image defect diagnosis model (see the following paragraphs) to be used to estimate the image defects on the basis of the judgment condition information stored in the external storage 30, in association with the type of the image defects into which the image data is classified by the clustering processing.

Then, the defect type judging portion 26 outputs, to the diagnostic portion 27, information on the image defect type into which the image defect data is classified by the clustering processing and information identifying the selected image defect diagnosis model.

<Description of Diagnostic Portion>

The diagnostic portion 27 estimates image defects by using an image defect diagnosis model. Specifically, the diagnostic portion 27 inputs, into the image defect diagnosis model, the feature amounts calculated by the feature amount extracting portion 25, the information on the type of the image defects acquired from the defect type judging portion 26, the operation input information (for example, "occurrence of black or colored spots") inputted by the user and acquired from the operation display 50, the various kinds of internal condition information on the image forming apparatus 1 acquired from the internal condition detector 90, usage history information on the image forming apparatus 1 stored in the external storage 30, and the like, and thereby estimates a fault cause bringing about the image defects.

In the estimation, the diagnostic portion 27 reads, from a storage (for example, a nonvolatile memory (NVM) 204 to be described later with reference to FIG. 8), an image defect diagnosis model corresponding to the type of the image defects selected by the defect type judging portion 26. In this exemplary embodiment, image defect diagnosis models corresponding respectively to multiple types of image defects are stored, in advance, in the storage provided in the diagnostic portion 27. Accordingly, the diagnostic portion 27 reads, from the storage, an image defect diagnosis model selected by the defect type judging portion 26.

Each of the "image defect diagnosis models" here is represented by a Bayesian network, for example. A Bayesian network models a problem area by using probability theory. Specifically, in order to represent a problem area having a complex casual relationship, a Bayesian network is expressed as a network having a graph structure in which causal relationships between multiple problem factors associated with each other are sequentially connected, and thereby representing the dependency relationship between the problem factors by a directed graph.

Figure 6:
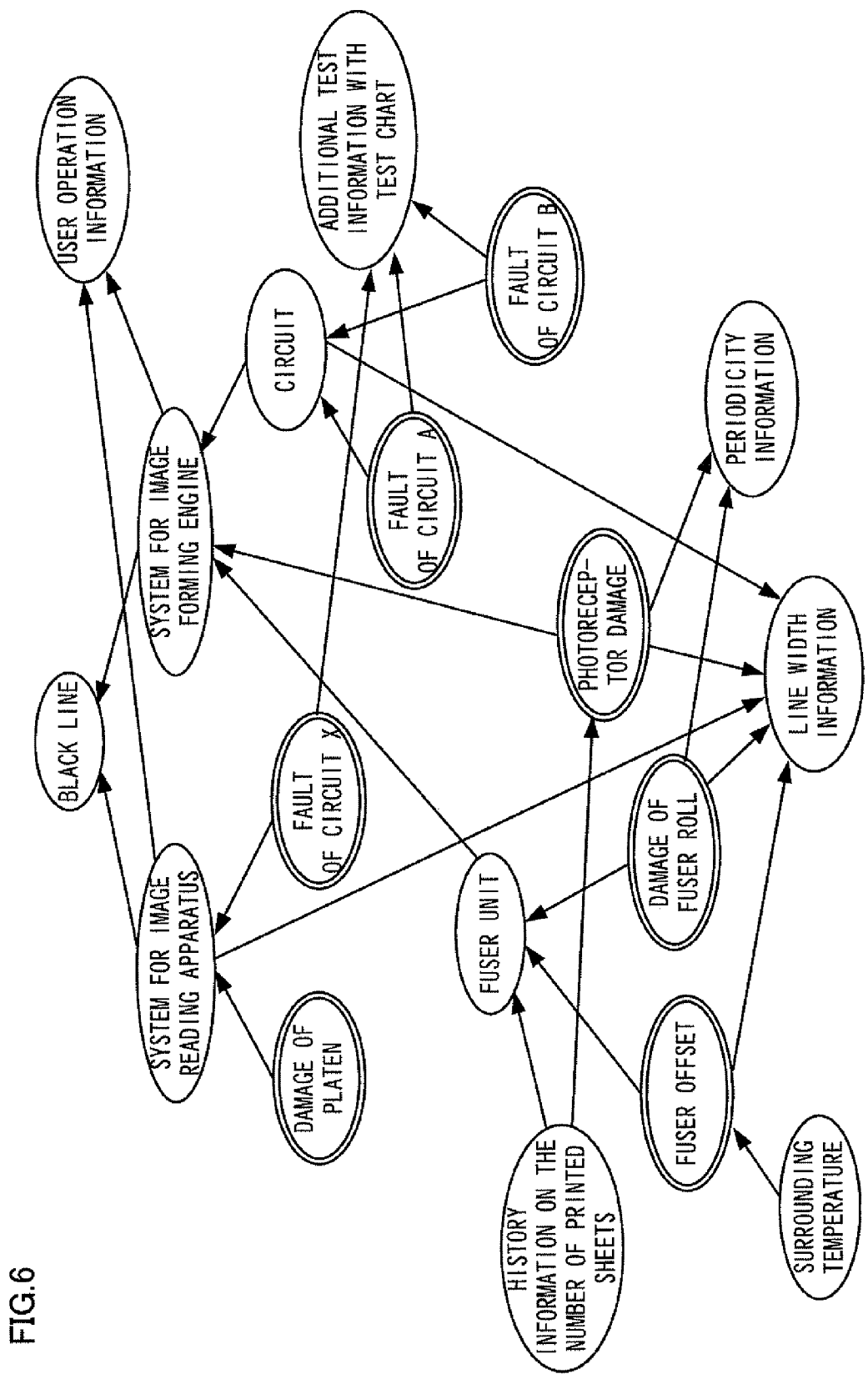
FIG. 6 is a view showing an example of the Bayesian network forming the image defect diagnosis model.

FIG. 6 is a view showing an example of the Bayesian network forming the image defect diagnosis model. The image defect diagnosis model shown in FIG. 6 is a Bayesian network corresponding to occurrence of a black line as an image result.

As shown in FIG. 6, each two nodes of the Bayesian network are connected to represent a "cause" to "effect" relationship. For example, the relationship between "photoreceptor damage" and "line width information" represents a relationship in which, due to a "photoreceptor damage" (cause), "line width information" indicating an occurrence of a thin line (effect) is generated. Meanwhile, the relationship between "history information on the number of printed sheets" and "fuser unit" represents a relationship in which a state based on the "number of printed sheets" (the number of printed sheets is a certain number or larger) (cause) increases the probability of occurrence of a black line attributable to deterioration of the "fuser unit". The initial value of the probability data on each node is determined, for example, on the basis of past data. The probability of each node may be updated regularly on the basis of statistic data on market troubles and the like including the frequency at which a component of the image forming apparatus 1 is changed, the frequency at which a problem occurs, and the like. In addition, the state of each node, such as "line width information" or "periodicity information" shown in FIG. 6, representing the feature of image defects is determined by the feature amounts calculated by the feature amount extracting portion 25.

On the basis of the Bayesian network read from the storage (a non-volatile memory (NVM) 204 to be described later), the diagnostic portion 27 estimates a fault cause and a fault part. Moreover, the diagnostic portion 27 notifies the controller 10 of the estimated fault cause and fault part. Thereby, the controller 10 displays the estimated fault cause and fault part on the operation display 50 to notify the user of the estimation results. The controller 10 may also notify an external apparatus such as a PC through the communicating part 70 via a network.

FIG. 7 is a view showing an example of a display screen for a diagnosis result displayed on the operation display 50. As shown in FIG. 7, "estimated fault causes and fault parts" are displayed in descending order of probability ("fault probability"), and "operation difficulty levels" of restoration of the respective failed states are also displayed. Displaying the operation difficulty levels leads to efficient restoration by performing, for example, when estimated fault causes and fault parts having close probabilities are displayed, restoration operation on the one having a lower operation difficulty level first. The display screen may be configured to display, in addition to the items shown in FIG. 7, operation information indicating restoration operation corresponding to each estimated fault cause and fault part, by operating the section for the corresponding "estimated fault cause and fault part."

<Description of Internal Configuration of Fault Diagnostic Unit>

Figure 8:
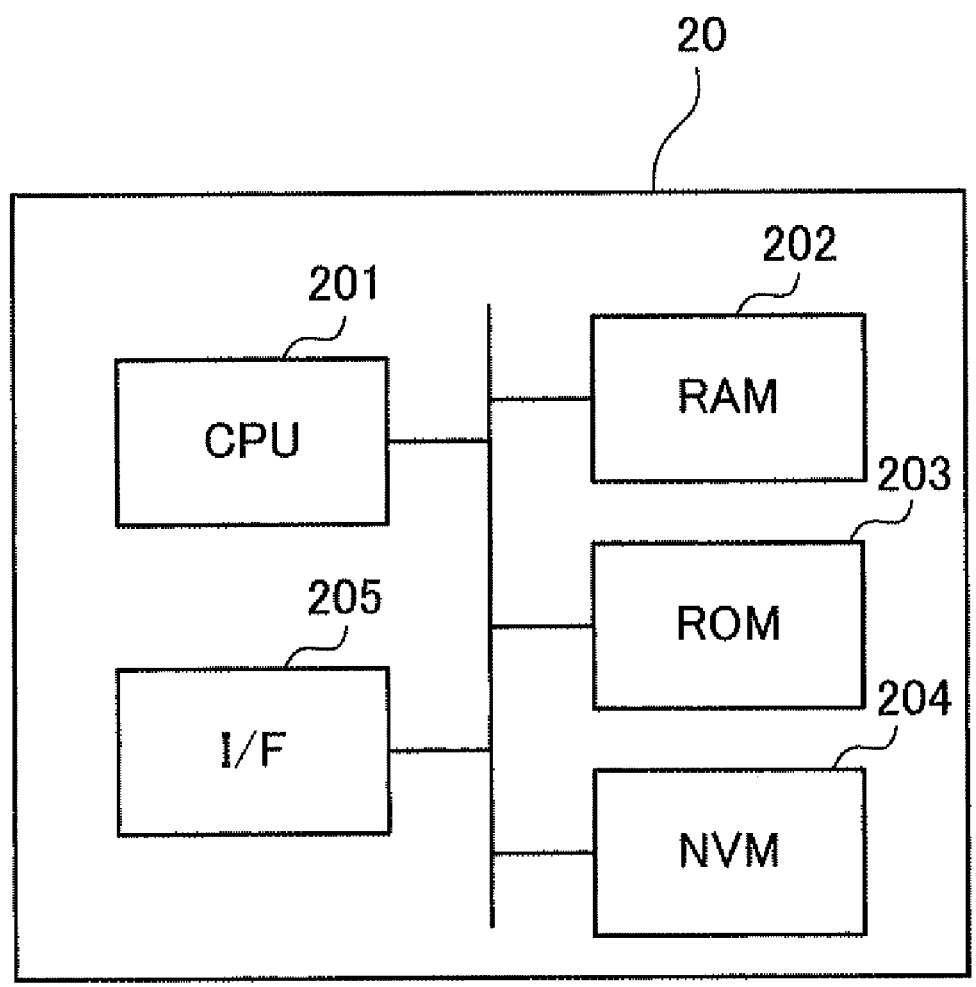
FIG. 8 is a block diagram showing an internal configuration of the fault diagnostic unit.

FIG. 8 is a block diagram showing an internal configuration of the fault diagnostic unit 20. As shown in FIG. 8, the fault diagnostic unit 20 includes a central processing unit (CPU) 201, a random access memory (RAM) 202, a read only memory (ROM) 203, the NVM 204 and an interface (I/F) 205. The CPU 201 performs digital arithmetic processing in accordance with a predetermined processing program in fault diagnosis processing. The RAM 202 is used as an operation memory for the CPU 201, or the like. The ROM 203 stores various set values and the like to be used in the processing by the CPU 201. The NVM 204 is a battery-backed rewritable flash memory or the like capable of storing data even when power supply is lost. The I/F 205 controls input and output of a signal to and from the units such as the controller 10, the external storage 30 and the image reading part 60 connected to the fault diagnostic unit 20 through the PCI bus 80.

With this configuration, the CPU 201 loads the processing program from the external storage 30 into the main storage (RAM 202), thereby implements the functions of the functional portions, i.e., the image data acquiring portion 21, the image defect detector 23, the inclination processor 24, the feature amount extracting portion 25, the defect type judging portion 26 and the diagnostic portion 27.

Another mode of providing the processing program is to provide the processing program stored in advance in the ROM 203 and then load the processing program into the RAM 202. Still another way, if the rewritable ROM 203 such as an electrically erasable and programmable ROM (EEPROM) is included, is to install only the program into the ROM 203 after setting of the CPU 201 and then load the program into the RAM 202. Still another way is to transmit the program to the fault diagnostic unit 20 via a network such as the Internet, install the program into the ROM 203 of the fault diagnostic unit 20, and then load the program into the RAM 202. Even still another way is to load the program from an external recording medium such as a DVD-ROM or a flash memory into the RAM 202.

[First Exemplary Embodiment]

<Detailed Description of Inclination Processor>

Next, an exemplary embodiment of the inclination processor 24 included in the above-described fault diagnostic unit 20 will be described.

Figure 9:
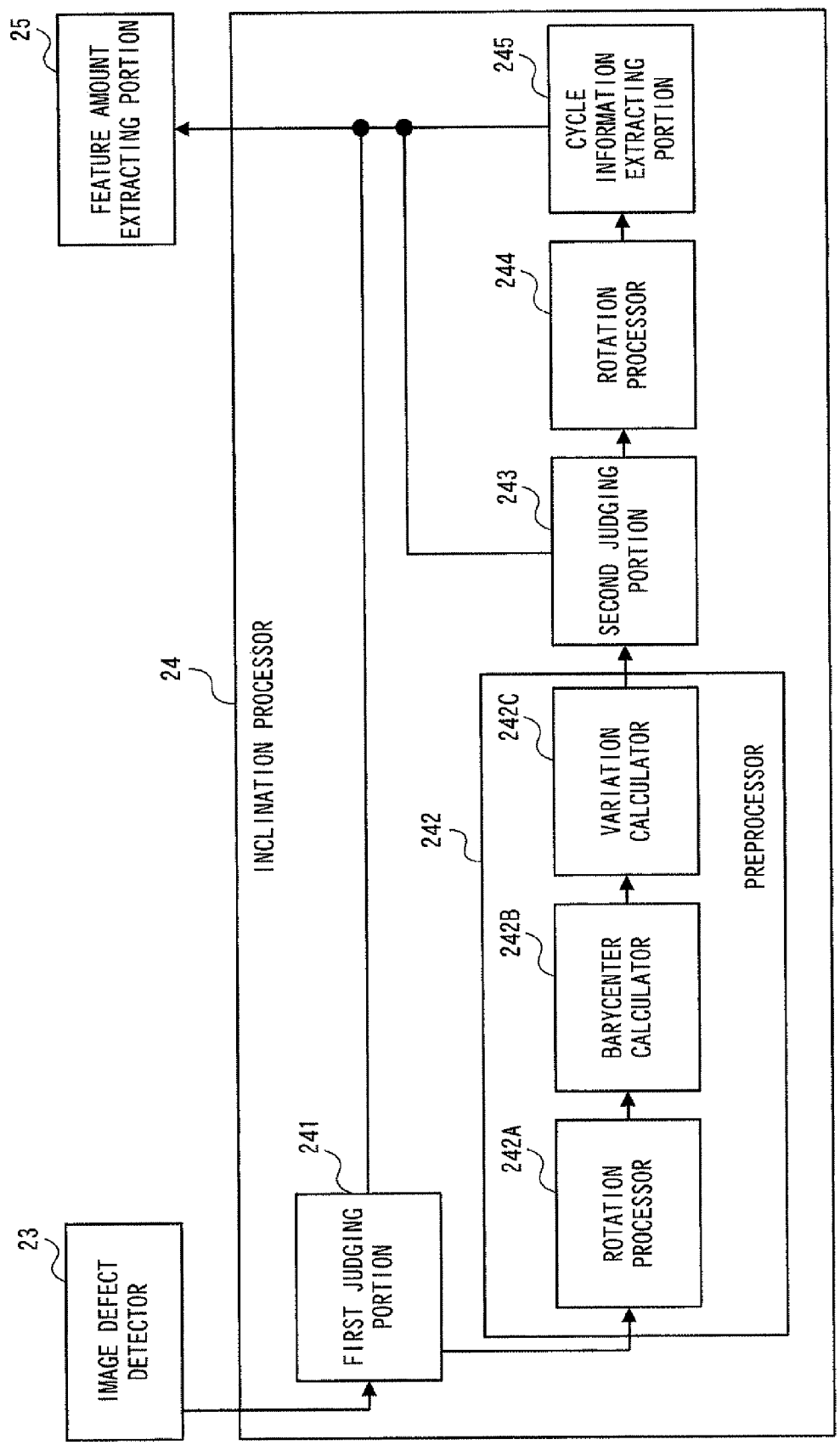
FIG. 9 is a block diagram for explaining a configuration of the inclination processor according to the first exemplary embodiment.

FIG. 9 is a block diagram for explaining a configuration of the inclination processor 24 according to the first exemplary embodiment.

As shown in FIG. 9, the inclination processor 24 includes a first judging portion 241 and a preprocessor 242. The first judging portion 241 is an example of a judging unit that judges whether or not the image defect data acquired from the image defect detector 23 is concerned with any one of fine image defects and locally-occurring image defects (hereinafter called "spot or local defects"). The preprocessor 242 calculates, when the image defect data is concerned with spot or local defects, information indicating a positional relationship between the spot or local defects (hereinafter called "relative positional information") to be used to judge whether the defects are periodic or random.

In addition, the inclination processor 24 includes a second judging portion 243, a rotation processor 244 and a cycle information extracting portion 245. The second judging portion 243 judges whether the spot or local defects are occurring periodically or randomly, by using the relative positional information on the spot or local defects calculated by the preprocessor 242. The rotation processor 244 performs, when the second judging portion 243 judges that the spot or local defects are periodic, rotation processing on the image defect data in order to extract cycle information on the spot or local defects. The cycle information extracting portion 245 extracts cycle information on the spot or local defects from the image defect data subjected to the rotation processing.

The preprocessor 242 included in the inclination processor 24 includes: a rotation processor 242A as an example of a coordinate conversion processor; and a barycenter calculator 242B and a variation calculator 242C, as an example of an occurrence state detecting unit that detects an occurrence state of each image defect.

The rotation processor 242A of the preprocessor 242 performs coordinate conversion processing. In the coordinate conversion processing, the rotation processor 242A sets, as rotation center coordinates, one point on the test chart image from which the image defect data acquired from the image defect detector 23 is extracted, and then rotates the coordinate system with respect to position coordinate information of the image defect data (position coordinate data) by a predetermined angle (for example, +/−1°).

The barycenter calculator 242B calculates, every time the coordinate conversion processing is performed on the image defect data at the predetermined angle, the barycenter of each of the spot or local defects at the new coordinate system.

The variation calculator 242C calculates a variation (Δ) in barycenter position of each of the spot or local defects calculated by the barycenter calculator 242B.

<Description of Each Portion Forming Inclination Processor>

The first judging portion 241 calculates the area of each image defect region from the image defect data acquired from the image defect detector 23, and then compares the calculated area with a specified area value that has been predetermined. If the area of the image defect region is greater than a first specified area value, the first judging portion 241 judges that the defect is not a fine image defect or a locally-occurring image defect (spot or local defect), and then transfers the image defect data acquired from the image defect detector 23 directly to the feature amount extracting portion 25.

By contrast, if the area of the image defect region is not greater than the first specified area value, the first judging portion 241 judges that the defect is a spot or local defect, and transfers the image defect data acquired from the image defect detector 23, to the preprocessor 242.

In this case, the first judging portion 241 may set a second specified area value which is less than the first specified area value and perform such processing that a spot or local defect having an area of the image defect region not greater than the second specified area value would be excluded. In this way, fine spot or local defects detected due to noise, for example, are excluded, and the accuracy in the variation ($\Delta$) calculated by the variation calculator 242C is increased.

Subsequently, in the preprocessor 242, the rotation processor 242A sets, as the rotation center coordinates for the image defect data transferred from the first judging portion 241, one point on the test chart image from which the image defect data is extracted. Then, the rotation processor 242A performs the coordinate conversion processing in which the coordinate system is rotated by a predetermined specific angle $\delta\theta$ (for example, $\delta\theta=1°$), with respect to the position coordinate data (position coordinate information) of the image defect data.

Figure 10:
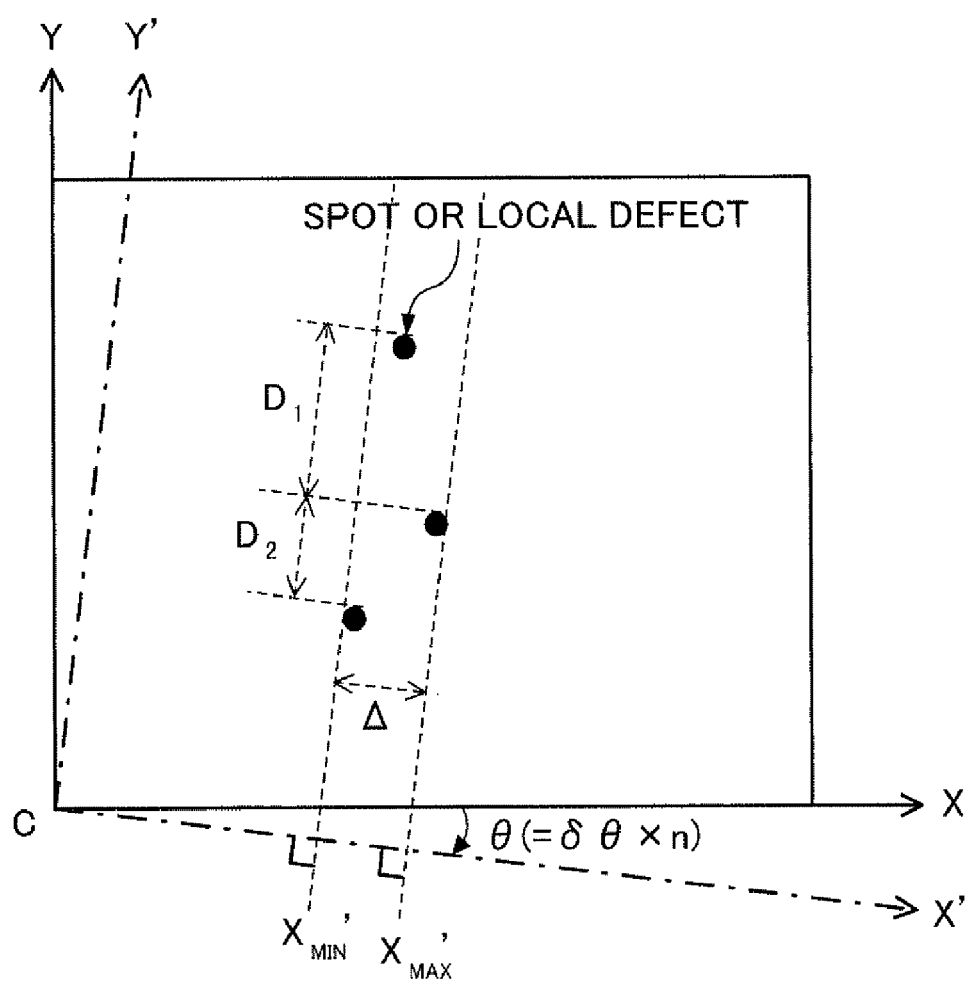
FIG. 10 is a view for explaining the coordinate conversion processing performed by the rotation processor.

FIG. 10 is a view for explaining the coordinate conversion processing performed by the rotation processor 242A.

As shown in FIG. 10, the rotation processor 242A sets, as the rotation center coordinates, one predetermined point (point C) on the test chart image. Then, the rotation processor 242A rotates the coordinate system (X-Y coordinate system) for the test chart image from which the image defect data is extracted, by the specific angle $\delta\theta$ (by the step of the specific angle $\delta\theta$) around the rotation center coordinates C, and thereby converts the coordinate system into a new coordinate system (X'-Y' coordinate system). For example, FIG. 10 shows the n-th coordinate conversion processing performing the n-th rotation of the coordinate system by the specific angle $\delta\theta$. In this case, the rotation angle $\theta$ is $\theta=\delta\theta*n$. With this angle $\theta$, the rotation processor 242A converts the position coordinate data of the image defect data into position coordinate data on the new X'-Y' coordinate system. The X coordinates (X' coordinates) here are on a coordinate axis in a first scan direction while the Y coordinates (Y' coordinates) are on a coordinate axis in a second scan direction.

For the image defect data subjected to the coordinate conversion processing by the rotation processor 242A, the barycenter calculator 242B of the preprocessor 242 calculates position coordinates of the barycenter of each spot or local defect on the basis of the position coordinate data on the new X'-Y' coordinate system.

Then, the variation calculator 242C of the preprocessor 242 calculates the variation $\Delta=X_{MAX}'-X_{MIN}'$ in the first scan direction (X' coordinate), for the barycenter positions of the spot or local defects existing on the test chart image. Here, $X_{MAX}'$ is the largest X' coordinate value among those of the barycenter positions of the spot or local defects existing on the test chart image, while $X_{MIN}'$ is the smallest X' coordinate value among those of the barycenter positions of the spot or local defects.

In this way, the preprocessor 242 performs the coordinate conversion processing in which the rotation processor 242A rotates the coordinate system for the image defect data transferred from the first judging portion 241, by the specific angle $\delta\theta$ within a predetermined angle range. Then, the barycenter calculator 242B calculates the barycenter positions of the spot or local defects, on each of the coordinate systems (X'-Y' coordinate systems) obtained by rotating the coordinate system by the specific angle $\delta\theta$. Moreover, the variation calculator 242C calculates the variation $\Delta$ in barycenter positions of the spot or local defects existing on the test chart image in the first scan direction (X' coordinate) as an example of a variation amount. Thereby, a correspondence relationship ($\theta$, $\Delta$) is generated, which associates the coordinate rotation angle $\theta$ ($=\delta\theta*n$) of each of the coordinate systems obtained by the coordinate conversion processing performed by the rotation processor 242A with the variation $\Delta$ of the spot or local defects on the coordinate system. From the correspondence relationship ($\theta$, $\Delta$), the preprocessor 242 detects an occurrence state of the image defects on each of the coordinate systems (X'-Y' coordinate systems).

Thereafter, from the preprocessor 242, the second judging portion 243 acquires the correspondence relationships ($\theta$, $\Delta$) each associating the coordinate rotation angle $\theta$ of each of the coordinate systems obtained by the coordinate conversion processing with the variation $\Delta$ of the spot or local defects on the coordinate system, and the position coordinate information on the barycenter positions of the spot or local defects calculated by the barycenter calculator 242B, in addition to the image defect data. Then, from the correspondence relationships ($\theta$, $\Delta$) of the coordinate systems acquired from the preprocessor 242, the second judgment portion 243 extracts the minimum value (hereinafter called "minimum variation $\Delta_{MIN}$") among the variations $\Delta$ of the spot or local defects, and a coordinate rotation angle $\theta$ ($=\theta_{MIN}$) of the coordinate system bringing about the minimum value $\Delta_{MIN}$.

Figure 11:
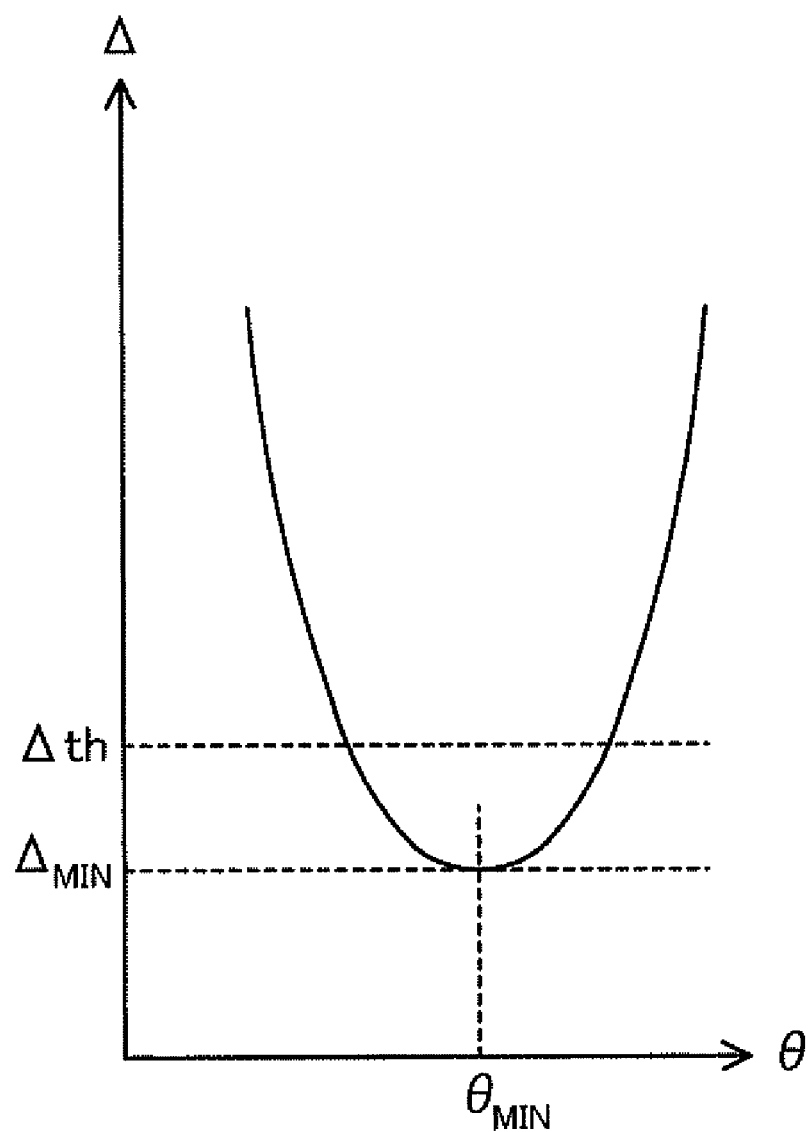
FIG. 11 is a graph showing an example of the correspondence relationships between the coordinate rotation angles of the coordinate systems and the variations of the spot or local defects of the coordinate systems, which arc generated by the preprocessor.

FIG. 11 is a graph showing an example of the correspondence relationships ($\theta$, $\Delta$) between the coordinate rotation angles $\theta$ of the coordinate systems and the variations $\Delta$ of the spot or local defects of the coordinate systems, which are generated by the preprocessor 242. The second judging portion 243 extracts the minimum variation $\Delta_{MIN}$ of the spot or local defects and the coordinate rotation angle $\theta_{MIN}$ of the coordinate system bringing about the minimum variation $\Delta_{MIN}$, from the coordinate rotation angles $\theta$ of the coordinate systems and the variations $\Delta$ of the spot or local defects of the coordinate systems having the correspondence relationship shown in FIG. 11.

Thereby, the second judging portion 243 compares the extracted minimum variation $\Delta_{MIN}$ of the spot or local defects and a predetermined specified value $\Delta$th of the variation $\Delta$. As a result of the comparison, if the minimum variation $\Delta_{MIN}$ is not smaller than the specified value $\Delta$th, the second judging portion 243 judges that the spot or local defects are occurring randomly. In this case, the second judging portion 243 transfers the image defect data transferred from the first judging portion 241, directly to the feature amount extracting portion 25.

By contrast, if the minimum variation $\Delta_{MIN}$ is smaller than the specified value $\Delta$th, the second judging portion 243 judges that the spot or local defects are occurring directionally or periodically. Then, the second judging portion 243 outputs, to the rotation processor 244, the image defect data transferred from the first judging portion 241, the data on the coordinate rotation angle $\theta_{MIN}$ bringing about the minimum variation $\Delta_{MIN}$ of the spot or local defects, and the position coordinate information on the barycenter position of the spot or local defects.

Here, the second judging portion 243 functions as a setting unit that sets the coordinate rotation angle in the coordinate conversion processing.

Here, the specified value $\Delta$th for judging whether the spot or local defects are occurring randomly, or occurring directionally or periodically, is set as follows, for example.

Figure 12A:
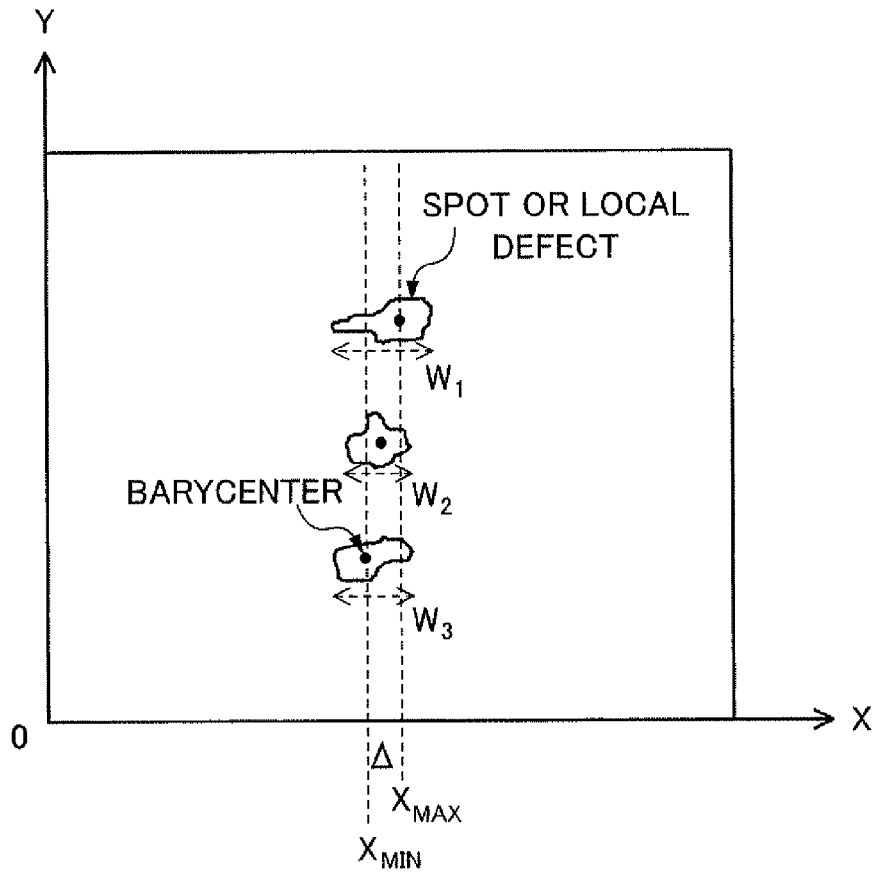
FIGS. 12A and 12B are views for explaining a method of setting the specified value.
Figure 12B:
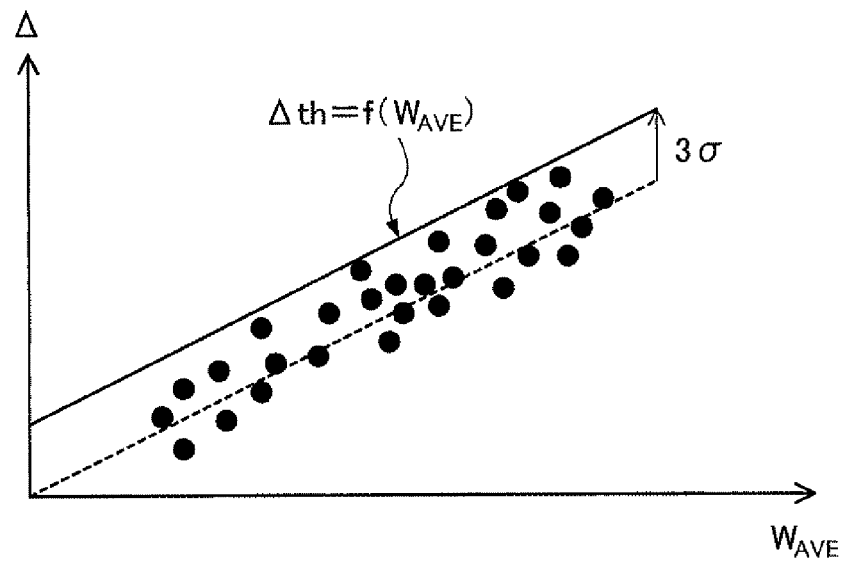

FIGS. 12A and 12B are views for explaining a method of setting the specified value Δth.

Firstly, as shown in FIG. 12A, a width ($W_i$), in the first scan direction (X coordinate), of the region of each of the image defects (spot or local defects) occurring periodically is measured in each of multiple sample images including the spot or local defects occurring periodically. Here, i is a number assigned to each of the spot or local defects occurring in the sample images.

Further, also calculated are: an average value ($W_{ave}=\Sigma W_i/n$) of the measured widths $W_i$ of the respective spot or local defects; and a difference Δ between the maximum value $X_{MAX}$ and the minimum value $X_{MIN}$ of the X coordinate values of the barycenter positions of the spot or local defects. In this case, the unit of each of $W_i$ and Δ is mm, and is calculated by multiplying the pixel position by 25.4 mm/R in accordance with a scanning resolution R (dpi) of the image reading part 60.

Then, as shown in FIG. 12B, a regression line of plots ($W_{ave}$, Δ) obtained from the multiple sample images is obtained by using a least-square method, for example. In addition, a variance $\sigma^2$ is obtained from a standard deviation σ between the regression line and the values Δ of the plots ($W_{ave}$, Δ). Then, the regression line is translated, for example, by 3σ in such a direction that the values Δ increase. This is to set the values Δ of the spot or local defects obtained from the sample images, to be positioned lower than the straight line obtained by translating the regression line, and the translation amount 3σ is a sufficient value to set the values Δ of the spot or local defects to be positioned lower than the straight line. In this way, the straight line is set as a calculation formula (hereinafter called a "specified-value calculation formula") for obtaining the specified value Δth.

Subsequently, by using the straight line (specified-value calculation formula) Δth=f($W_{ave}$) shown in FIG. 12B, the specified value Δth in the test target image (test chart image) is calculated. Specifically, the specified-value straight line Δth=f($W_{ave}$) may be expressed concretely as follows:

$$\Delta th = a * W_{ave} + b \ (a, b: \text{constants}) \quad (1)$$

By calculating the average value $W_{ave}$ of the widths $W_i$, in the first scan direction (X coordinate), of the image defect regions in the test chart images, and substituting the calculated average value $W_{ave}$ for the formula (1), the specified value Δth is obtained.

Subsequently, the rotation processor 244 acquires, from the second judging portion 243, the image defect data (including the position coordinate information on the barycenter positions of the spot or local defects calculated by the preprocessor 242) transferred from the first judging portion 241, and the data on the coordinate rotation angle $\theta_{MIN}$ bringing about the minimum variation $\Delta_{MIN}$ of the spot or local defects. Then, as in the case of the above-described rotation processor 242A of the preprocessor 242, the rotation processor 244 sets, as the rotation center coordinates C, one point on the test chart image from which the image defect data is extracted, and performs coordinate conversion processing on the position coordinate data of the image defect data by rotating the coordinate system by the coordinate rotation angle $\theta_{MIN}$. Thereby, the rotation processor 244 converts the position coordinate data of the image defect data into position coordinate data on the new coordinate system obtained by rotating the coordinate system by the coordinate rotation angle $\theta_{MIN}$.

The rotation processor 244 outputs, to the cycle information extracting portion 245, the image defect data transferred from the first judging portion 241 and the image defect data (including the position coordinate information on the barycenter positions of the spot or local defects calculated by the preprocessor 242) converted into the position coordinate data on the new coordinate system obtained by rotating the coordinate system by the coordinate rotation angle $\theta_{MIN}$.

The cycle information extracting portion 245 acquires, from the rotation processor 244, the image defect data transferred from the first judging portion 241 and the image defect data (including the position coordinate information on the barycenter positions of the spot or local defects) on the new coordinate system obtained by rotating the coordinate system by the coordinate rotation angle $\theta_{MIN}$. Then, from the image defect data on the new coordinate system obtained by rotating the coordinate system by the coordinate rotation angle $\theta_{MIN}$, the cycle information extracting portion 245 calculates distances $D_i$ (i=1, 2, 3 . . . ) in the second scan direction (Y' coordinate) between the barycenters of the spot or local defects (see FIG. 10 described above).

The cycle information extracting portion 245 compares each of the calculated distances $D_i$ in the second scan direction (Y' coordinate) with cycle information held in advance. As a result of the comparison, if the distance $D_i$ matches one piece of the cycle information held in advance, the cycle information extracting portion 245 holds the cycle information piece as a "feature amount of the cycle of the image defects." Then, the cycle information extracting portion 245 outputs, to the feature amount extracting portion 25, the feature amount of the cycle of the image defects together with the image defect data on the new coordinate system obtained by rotating the coordinate system by the coordinate rotation angle $\theta_{MIN}$. From the image defect data on the new coordinate system obtained by rotating the coordinate system by the coordinate rotation angle $\theta_{MIN}$, the feature amount extracting portion 25 also extracts feature amounts other than the feature amount of the cycle. The cycle information extracting portion 245 here also functions as a feature amount extracting unit.

By contrast, as a result of the comparison, if the distance $D_i$ does not match any one piece of the cycle information, the cycle information extracting portion 245 discards the information on the calculated distance $D_i$ in the second scan direction (Y' coordinate), and transfers the image defect data transferred from the first judging portion 241, directly to the feature amount extracting portion 25. Thereby, the feature amount extracting portion 25 extracts feature amounts from the image defect data transferred from the first judging portion 241, that is, the image defect data acquired from the image defect detector 23.

Here, the cycle information pieces compared with the calculated distance $D_i$ in the second scan direction (Y' coordinate) are, for example, information on cycles based on the peripheral lengths of a photoreceptor, a primary transfer roll, a secondary transfer roll, a fuser roll and the like included in the image forming part 40. The cycle information pieces are stored in the NVM 204 or the like, for example.

<Description of Fault Diagnosis Processing>

Next, the fault diagnosis processing performed by the fault diagnostic unit 20 of the first exemplary embodiment will be described.

FIGS. 13-1 and 13-2 are flowcharts for explaining an example of the fault diagnosis processing performed by the fault diagnostic unit 20.

Firstly, as shown in FIG. 13-1, the fault diagnostic unit 20 acquires, at the image data acquiring portion 21, image data on a test chart image (test target image) from the image reading part 60, and then stores the image data in the image data storage 22 (Step 101).

The image defect detector 23 of the fault diagnostic unit 20 acquires the image data from the image data storage 22, compares the image data on the test chart image with the reference image data acquired from the external storage 30, and then extracts regions each including an image defect (image defect regions) (Step 102).

The inclination processor 24 of the fault diagnostic unit 20 calculates the area of each of the image defect regions from the "image defect data" associating the image data on the corresponding region judged as an image defect (image defect region) and the position coordinate information on the test chart image (position coordinate data) with each other, and compares the area with the predetermined specified area value (Step 103). Then, if the area of the image defect region is greater than a specified area value (e.g., the above-described "first specified area value") (Yes in Step 103), the inclination processor 24 judges that the image defect is not a fine image defect or a locally-occurring image defect (spot or local defect). Moreover, the feature amount extracting portion 25 of the fault diagnostic unit 20 extracts various feature amounts characterizing the image defect from the image defect data on the test chart image (test target image) read by the image reading part 60 (acquired from the image defect detector 23) (Step 119).

By contrast, if the area of the image defect region is not greater than the specified area value (e.g., the above-described "first specified area value") (No in Step 103), the inclination processor 24 judges that the image defect is a spot or local defect. Then, the inclination processor 24 of the fault diagnostic unit 20 performs the coordinate conversion processing on the image defect data acquired from the image defect detector 23.

Firstly, the inclination processor 24 sets the coordinate rotation angle θ to be θ=0° for the coordinate conversion processing to be performed on the coordinate system (X-Y coordinate system) of the test chart image by using the rotation center coordinates C as the center (Step 104). Then, the inclination processor 24 calculates the position coordinates of the barycenter of each spot or local defect (barycenter position coordinates) at the coordinate rotation angle θ=0° (Step 105). Moreover, the inclination processor 24 calculates the variation Δ (=$X_{MAX}$−$X_{MIN}$) in barycenter positions in the first scan direction (X coordinate) for the spot or local defects existing on the test chart image (Step 106).

Here, $X_{MAX}$ is the largest X coordinate value among those of the barycenters of the spot or local defects existing on the test chart image, while $X_{MIN}$ is the smallest X coordinate value among those of the barycenters of the spot or local defects.

The inclination processor 24 generates and stores the correspondence relationship (θ, Δ) associating the coordinate rotation angle θ of each coordinate system used in the coordinate conversion processing (θ=0°, here) and the variation Δ of the spot or local defects on the coordinate system (Step 107).

Subsequently, the inclination processor 24 adds the specific angle δθ to the coordinate rotation angle θ, and thereby sets a new coordinate rotation angle θ (Step 108). Then, the inclination processor 24 judges whether or not the newly-set coordinate rotation angle θ is within the predetermined angle range (Step 109).

If the newly-set coordinate rotation angle θ is within the predetermined angle range (Yes in Step 109), the processing returns to Step 105, and the inclination processor 24 performs the Steps 105 to 108 of the processing by using the newly-set coordinate rotation angle θ.

If the newly-set coordinate rotation angle θ exceeds the predetermined angle range (No in Step 109), the coordinate conversion processing is terminated.

Next, the processing advances to the flowchart in FIG. 13-2. The second judging portion 243 of the inclination processor 24 extracts the minimum value of the variations Δ of the spot or local defects (minimum variation $Δ_{MIN}$) and the coordinate rotation angle θ (=$θ_{MIN}$) of the coordinate system bringing about the minimum variation $Δ_{MIN}$, from the correspondence relationships (θ, Δ) between the coordinate rotation angles θ of the coordinate systems and the variations Δ of the spot or local defects on the coordinate systems (Step 110).

Then, the second judging portion 243 compares the extracted minimum variation $Δ_{MIN}$ of the spot or local defects with the predetermined specified value Δth for the variations Δ (Step 111). If the minimum variation $Δ_{MIN}$ is greater than the specified value Δth (Yes in Step 111), the second judging portion 243 judges that the spot or local defects are occurring randomly, and the feature amount extracting portion 25 of the fault diagnostic unit 20 extracts various feature amounts characterizing the image defects, from the image defect data on the test chart image (test target image) read by the image reading part 60 (acquired from the image defect detector 23) (Step 119).

By contrast, if the minimum variation $Δ_{MIN}$ is not greater than the specified value Δth (No in Step 111), the second judging portion 243 judges that the spot or local defects are occurring directionally or periodically.

As a result of the judgment, the rotation processor 244 of the inclination processor 24 acquires, from the second judging portion 243, data on the coordinate rotation angle $θ_{MIN}$ bringing about the minimum variation $Δ_{MIN}$ of the spot or local defects (Step 112). Then, the rotation processor 244 sets, as the rotation center coordinates C, one point on the test chart image from which the image defect data is extracted, and performs the coordinate conversion processing on the position coordinate data of the image defect data on the test chart image by rotating the coordinate system by the coordinate rotation angle $θ_{MIN}$ (Step 113).

The cycle information extracting portion 245 of the inclination processor 24 calculates distances $D_i$ (i=1, 2, 3 . . . ) in the second scan direction (Y' coordinate) between the barycenters of the spot or local defects, from the image defect data on the new coordinate system obtained by rotating the coordinate system by the coordinate rotation angle $θ_{MIN}$ (Step 114).

The cycle information extracting portion 245 compares each of the calculated distances $D_i$ in the second scan direction (Y' coordinate) with the cycle information held in advance (Step 115). As a result, if the distance $D_i$ matches one piece of the cycle information (Yes in Step 115), the cycle information extracting portion 245 holds the cycle information piece as a "feature amount of the cycle of the image defects" (Step 116). The feature amount of the cycle of the image defects is outputted to the feature amount extracting portion 25 together with the image defect data on the new coordinate system obtained by rotating the coordinate system by the coordinate rotation angle $θ_{MIN}$.

The feature amount extracting portion 25 extracts feature amounts, other than the feature amount of the cycle of the image defects, characterizing the image defects, on the basis of the image defect data acquired from the inclination processor 24 (Step 117).

By contrast, as a result of the comparison, if the distance $D_i$ does not match any one piece of the cycle information (No in Step 115), the cycle information extracting portion 245 discards the information on the calculated distance $D_i$ in the second scan direction (Y' coordinate) (Step 118).

Then, the feature amount extracting portion 25 extracts various feature amounts characterizing the image defects, from the image defect data on the test chart image (test target image) read by the image reading part 60 (acquired from the image defect detector 23) (Step 119).

Thereafter, the feature amounts extracted by the feature amount extracting portion 25 are transferred to the defect type judging portion 26 and the diagnostic portion 27, and the fault diagnosis processing for diagnosing a fault cause bringing about the image defects is performed (Step 120).

[Second Exemplary Embodiment]
<Detailed Description of Inclination Processor>

Next, another exemplary embodiment of the above-described inclination processor 24 included in the fault diagnostic unit 20 will be described.

The first exemplary embodiment describes a configuration of the inclination processor 24 that judges whether or not spot or local defects are occurring directionally or periodically, on the basis of the variations Δ in barycenter positions of the spot or local defects. The second exemplary embodiment, by contrast, describes a configuration of an inclination processor 24 that judges whether or not spot or local defects are occurring directionally or periodically, on the basis of the variances of projection distribution waveforms of spot or local defects on the coordinate axis in the first scan direction (X coordinate axis). Here, the same components as those in the first exemplary embodiment are denoted by the same reference numerals, and the detailed description of those are omitted.

Figure 14:
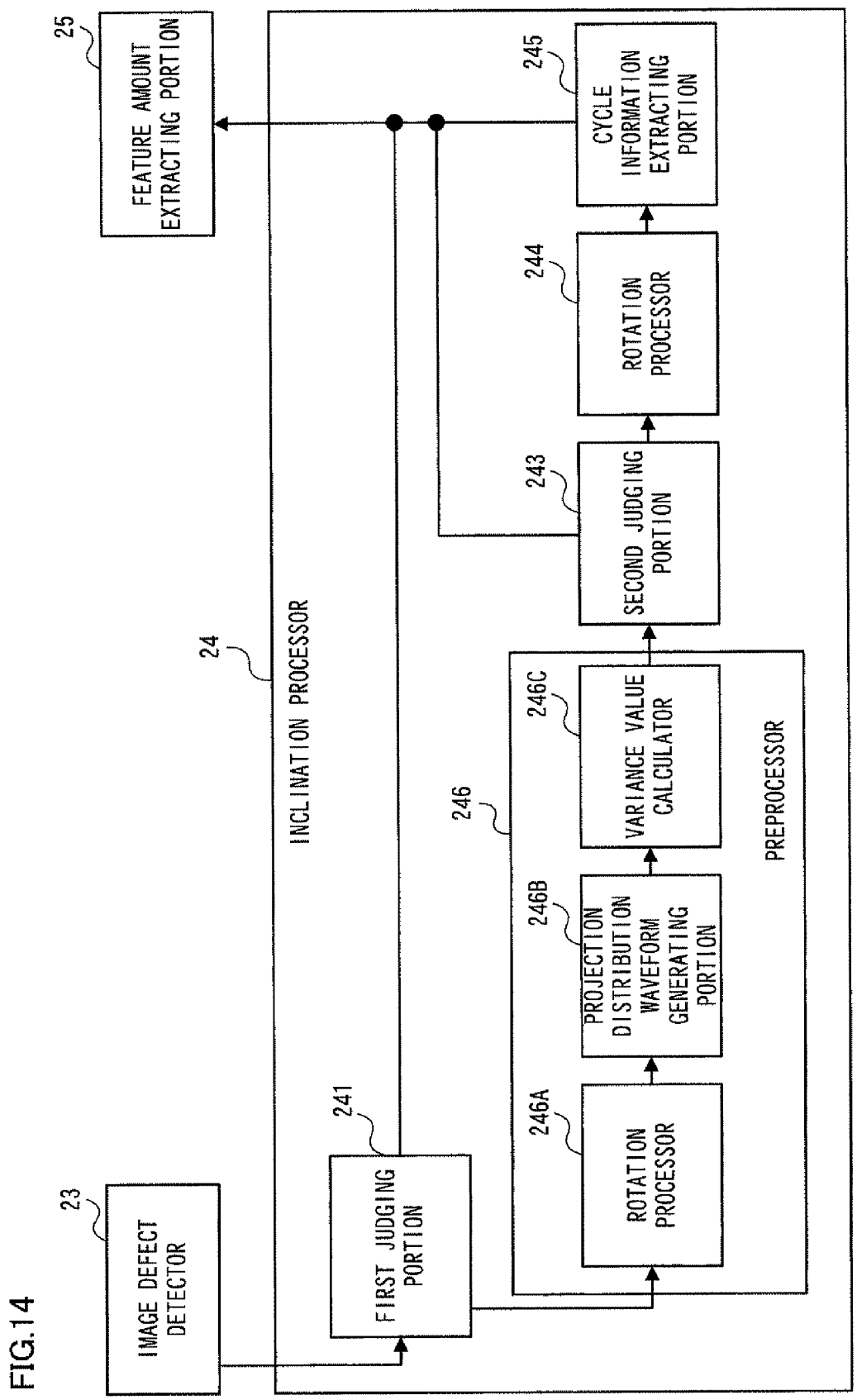
FIG. 14 is a block diagram for explaining the configuration of the inclination processor according to the second exemplary embodiment.

FIG. 14 is a block diagram for explaining the configuration of the inclination processor 24 according to the second exemplary embodiment.

As shown in FIG. 14, in the inclination processor 24 of the second exemplary embodiment, a preprocessor 246 includes: a rotation processor 246A as an example of a coordinate conversion processor; and a projection distribution waveform generating portion 246B and a variance value calculator 246C, as an example of an occurrence state detecting unit that detects an occurrence state of image defects.

The rotation processor 246A of the preprocessor 246 sets, as rotation center coordinates, one point on a test chart image from which image defect data acquired from an image defect detector 23 is extracted, and performs coordinate conversion processing on position coordinate information of the image defect data (position coordinate data) by rotating the coordinate system by a predetermined angle (±1°, for example).

Every time the coordinate conversion processing is performed on the image defect data by rotating the coordinate system at the predetermined angle, the projection distribution waveform generating portion 246B obtains a projection distribution waveform of the spot or local defects on the X (X') coordinate axis, on the new coordinate system. Specifically, the projection distribution waveform generating portion 246B obtains a projection distribution waveform of pixels forming the spot or local defects on the X (X') coordinate axis (the total numbers of the pixels at the respective X (X') coordinate values) with regard to the spot or local defects on the new coordinate system.

The variance value calculator 246C calculates, as an example of a variation amount, a variance value ($\sigma^2$) of the projection distribution waveform of the spot or local defects (the total numbers of the pixels, forming the spot or local defects, at the respective X (X') coordinate values) obtained by the projection distribution waveform generating portion 246B.

In the preprocessor 246 of the second exemplary embodiment, the rotation processor 246A performs the coordinate conversion processing on the image defect data transferred from a first judging portion 241, by rotating the coordinate system by a specific angle δθ within a predetermined angle range. Then, the projection distribution waveform generating portion 246B obtains the total numbers of pixels forming the spot or local defects at respective X' coordinate values (a projection distribution waveform), on each coordinate system (X'-Y' coordinate system) obtained by rotating the coordinate system by the specific angle δθ. Further, the variance value calculator 246C calculates the variance value $\sigma^2$ of the projection distribution waveform of the spot or local defects existing on the test chart image. Thereby, a correspondence relationship ($\theta$, $\sigma^2$) is generated, which associates a coordinate rotation angle $\theta$ ($=\delta\theta*n$) on each corresponding coordinate system used in the coordinate conversion processing by the rotation processor 246A with the variance value $\sigma^2$ of the spot or local defects on each coordinate system. On the basis of the correspondence relationship ($\theta$, $\sigma^2$), the preprocessor 246 detects an occurrence state of the image defects on each coordinate system (X'-Y' coordinate system).

Figure 15:
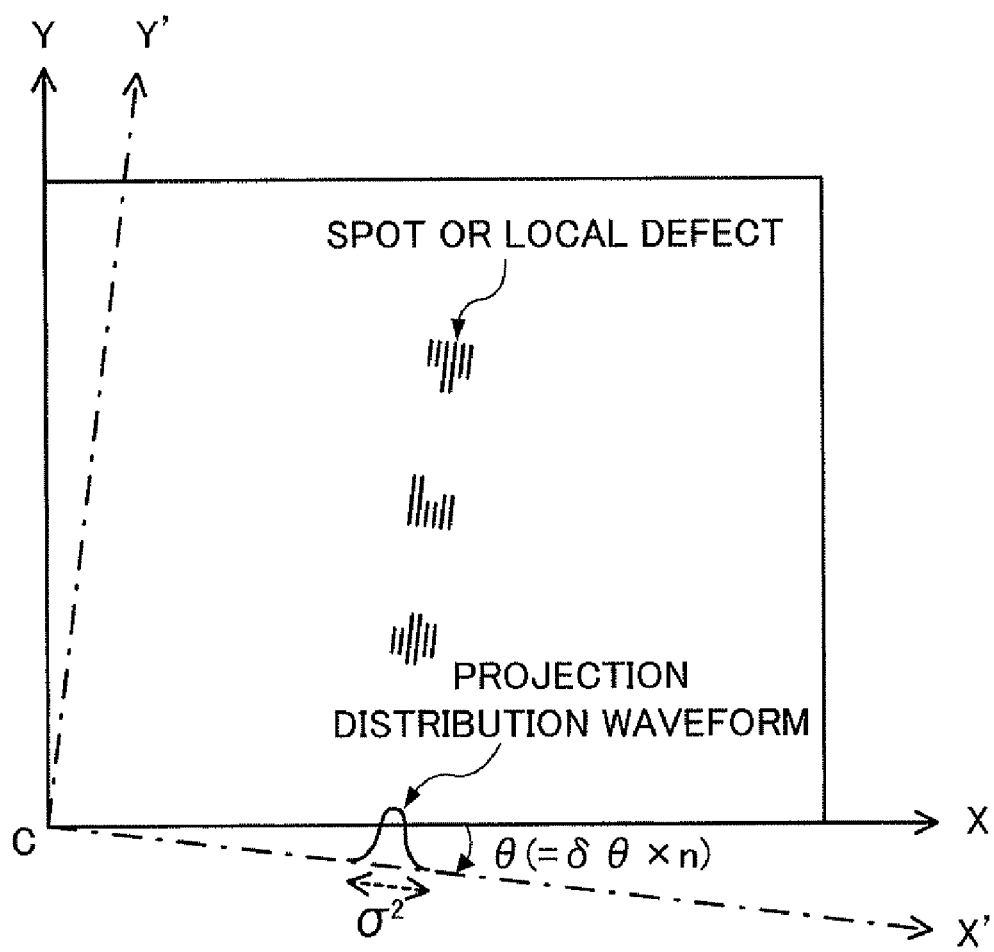
FIG. 15 is a view for explaining a projection distribution waveform obtained by the preprocessor.

FIG. 15 is a view for explaining a projection distribution waveform obtained by the preprocessor 246.

As shown in FIG. 15, the rotation processor 246A sets, as rotation center coordinates, one predetermined point (point C) on the test chart image. Then, the rotation processor 246A rotates the coordinate system (X-Y coordinate system) for the test chart image from which the image defect data is extracted, by the specific angle δθ (by the step of the specific angle δθ) by using the rotation center coordinates C as the center, and then converts the coordinate system into the new coordinate system (X'-Y' coordinate system). For example, FIG. 15 shows the n-th coordinate conversion processing performing n-th rotation of the coordinate system by the specific angle δθ. In this case, the rotation angle $\theta$ is $\theta=\delta\theta*n$. With this angle $\theta$, the rotation processor 246A converts the position coordinate data of the image defect data into position coordinate data on the new X'-Y' coordinate system. The X coordinates (X' coordinates) here are on a coordinate axis in the first scan direction while the Y coordinates (Y' coordinates) are on a coordinate axis in a second scan direction.

Then, the projection distribution waveform generating portion 246B obtains the total numbers of pixels forming the spot or local defects at respective X' coordinate values (a projection distribution waveform) on the new coordinate system (X'-Y' coordinate system). Further, the variance value calculator 246C calculates a variance value $\sigma^2$ of the projection distribution waveform of the spot or local defects obtained by the projection distribution waveform generating portion 246B.

Subsequently, the second judging portion 243 of the second exemplary embodiment acquires, from the preprocessor 246, correspondence relationships ($\theta$, $\sigma^2$) each associating the coordinate rotation angle $\theta$ of the corresponding coordinate system used in the coordinate conversion processing with the variance value $\sigma^2$ of the projection distribution waveform of the spot or local defects on each coordinate system, in addition to the image defect data. Then, from the correspondence relationships ($\theta$, $\sigma^2$) on the respective coordinate systems acquired from the preprocessor 246, the second judging portion 243 extracts the minimum value among the variances $\sigma^2$ of the projection distribution waveforms of the spot or local defects (hereinafter called a "minimum variance value $\sigma^2_{MIN}$") and the coordinate rotation angle $\theta$ of the coordinate system bringing about the minimum variance value $\sigma^2_{MIN}$ ($=\theta_{MIN}$).

Figure 16:
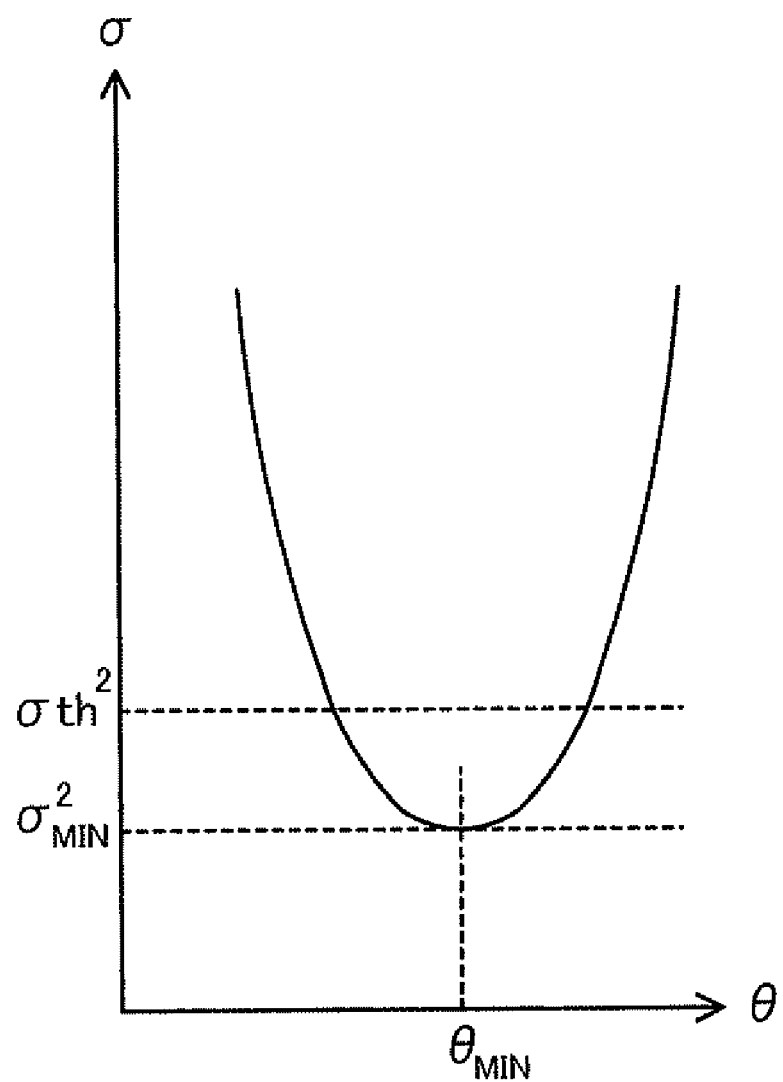
FIG. 16 is a graph showing an example of the correspondence relationships between the coordinate rotation angles of the corresponding coordinate systems and the variance values of the projection distribution waveforms of the spot or local defects on the coordinate systems, which are generated by the preprocessor.

FIG. 16 is a graph showing an example of the correspondence relationships ($\theta$, $\rho^2$) between the coordinate rotation angles $\theta$ of the corresponding coordinate systems and the variance values $\sigma^2$ of the projection distribution waveforms of the spot or local defects on the coordinate systems, which are generated by the preprocessor 246. From the coordinate rotation angles θ on the respective coordinate systems and the variance values $\sigma^2$ of the projection distribution waveforms of the spot or local defects on the coordinate systems, each coordinate rotation angle θ and the corresponding variance value $\sigma^2$ having the correspondence relationship shown in FIG. 16, the second judging portion 243 extracts the minimum variance value $\sigma^2_{MIN}$ for the spot or local defects and the coordinate rotation angle $\theta_{MIN}$ of the coordinate system bringing about the minimum variance value $\sigma^2_{MIN}$.

Then, the second judging portion 243 compares the extracted minimum variance value $\sigma^2_{MIN}$ of the spot or local defects with a predetermined specified value $\sigma th^2$ for the variance values $\sigma^2$. As a result of the comparison, if the minimum variance value $\sigma^2_{MIN}$ is not smaller than the specific value $\sigma th^2$, the second judging portion 243 judges that the spot or local defects are occurring randomly. In this case, the second judging portion 243 transfers the image defect data transferred from the first judging portion 241, directly to the feature amount extracting portion 25. Thereby, the feature amount extracting portion 25 extracts feature amounts from the image defect data transferred from the first judging portion 241, that is, the image defect data acquired from the image defect detector 23.

By contrast, if the minimum variance value $\sigma^2_{MIN}$ is smaller than the specified value $\sigma th^2$, the second judging portion 243 judges that the spot or local defects are occurring directionally or periodically. Then, the second judging portion 243 outputs, to the rotation processor 244, the image defect data transferred from the first judging portion 241 and the data on the coordinate rotation angle $\theta_{MIN}$ bringing about the minimum variance value $\sigma^2_{MIN}$ of the spot or local defects.

The rotation processor 244 acquires, from the second judging portion 243, the image defect data transferred from the first judging portion 241 and the data on the coordinate rotation angle $\theta_{MIN}$ bringing about the minimum variance value $\sigma^2_{MIN}$ of the spot or local defects. Thereby, as in the case of the above-described rotation processor 242A of the preprocessor 246, the rotation processor 244 sets, as the rotation center coordinates C, one point on the test chart image from which the image defect data is extracted, and then performs the coordinate conversion processing on the position coordinate data of the image defect data by rotating the coordinate system by the coordinate rotation angle $\theta_{MIN}$. Thereby, the rotation processor 244 converts the position coordinate data of the image defect data into position coordinate data on the new coordinate system obtained by rotating the coordinate system by the coordinate rotation angle $\theta_{MIN}$.

The rotation processor 244 outputs, to a cycle information extracting portion 245, the image defect data transferred from the first judging portion 241 and the image defect data converted into the position coordinate data on the new coordinate system obtained by rotating the coordinate system by the coordinate rotation angle $\theta_{MIN}$.

The cycle information extracting portion 245 acquires, from the rotation processor 244, the image defect data transferred from the first judging portion 241 and the image defect data on the new coordinate system obtained by rotating the coordinate system by the coordinate rotation angle $\theta_{MIN}$. Then, the cycle information extracting portion 245 calculates the average values of Y' coordinate values of each of the spot or local defects in the image defect data on the new coordinate system obtained by rotating the coordinate system by the coordinate rotation angle $\theta_{MIN}$. Thereafter, the cycle information extracting portion 245 compares the difference between the calculated average values of the Y' coordinate values (average Y' coordinate values) of the spot or local defects, with cycle information held in advance. As a result of the comparison, if the difference matches one piece of the cycle information held in advance, the cycle information extracting portion 245 holds the cycle information piece as a "feature amount of the cycle of the image defects." Then, the cycle information extracting portion 245 outputs, to the feature amount extracting portion 25, the feature amount of the cycle of the image defects together with the image defect data on the new coordinate system obtained by rotating the coordinate system by the coordinate rotation angle $\theta_{MIN}$. Thereby, the feature amount extracting portion 25 further extracts feature amounts other than the feature amount of the cycle, from the image defect data on the new coordinate system obtained by rotating the coordinate system by the coordinate rotation angle $\theta_{MIN}$.

As a result of the comparison, if the difference does not match any one piece of the cycle information, by contrast, the cycle information extracting portion 245 transfers the image defect data transferred from the first judging portion 241, directly to the feature amount extracting portion 25. Thereby, the feature amount extracting portion 25 extracts feature amounts from the image defect data transferred from the first judging portion 241, that is, the image defect data acquired from the image defect detector 23.

<Description of Fault Diagnosis Processing>

Next, the fault diagnosis processing performed by the fault diagnostic unit 20 of the second exemplary embodiment will be described.

Figures 1, 17:
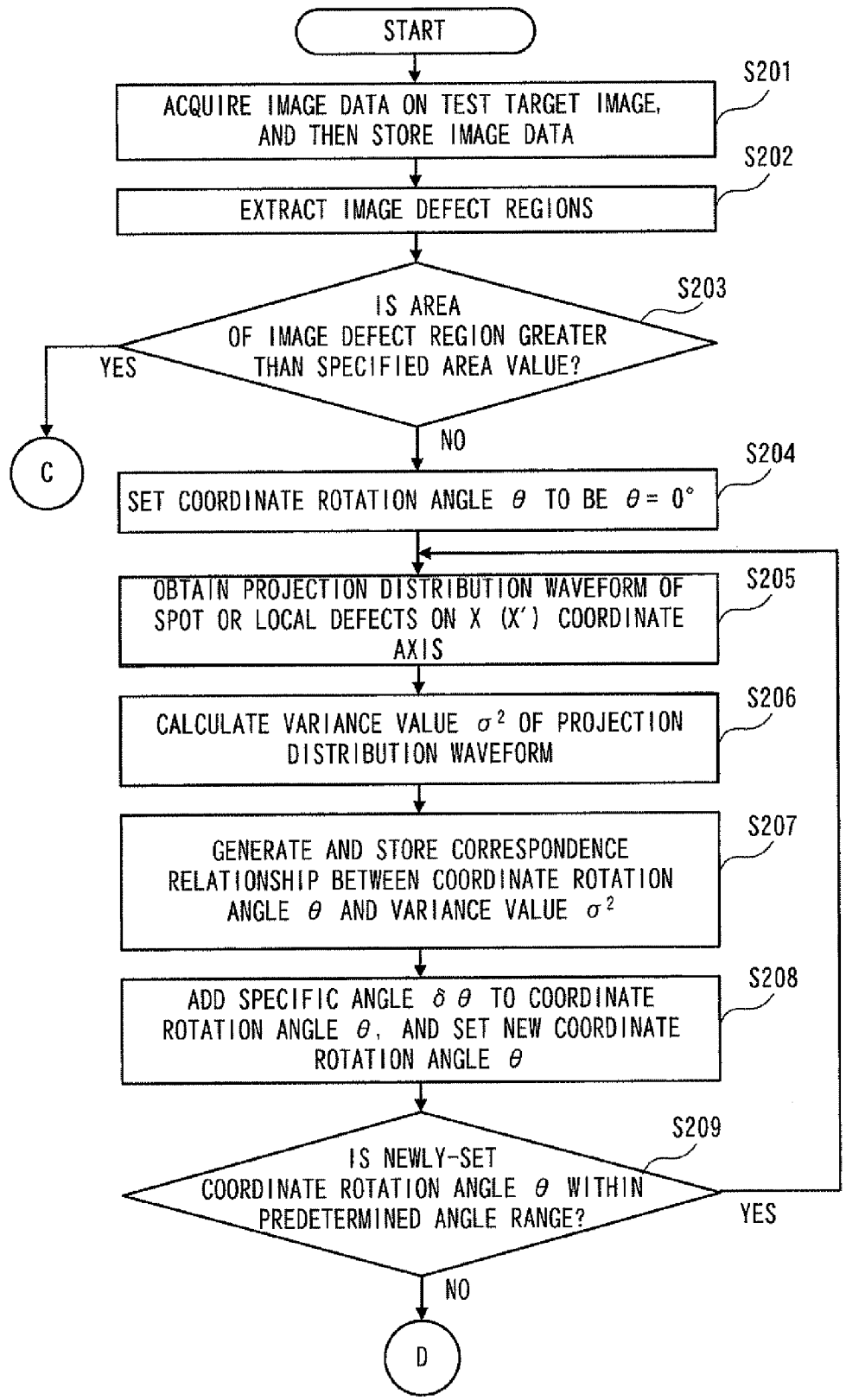
Figures 2, 17:
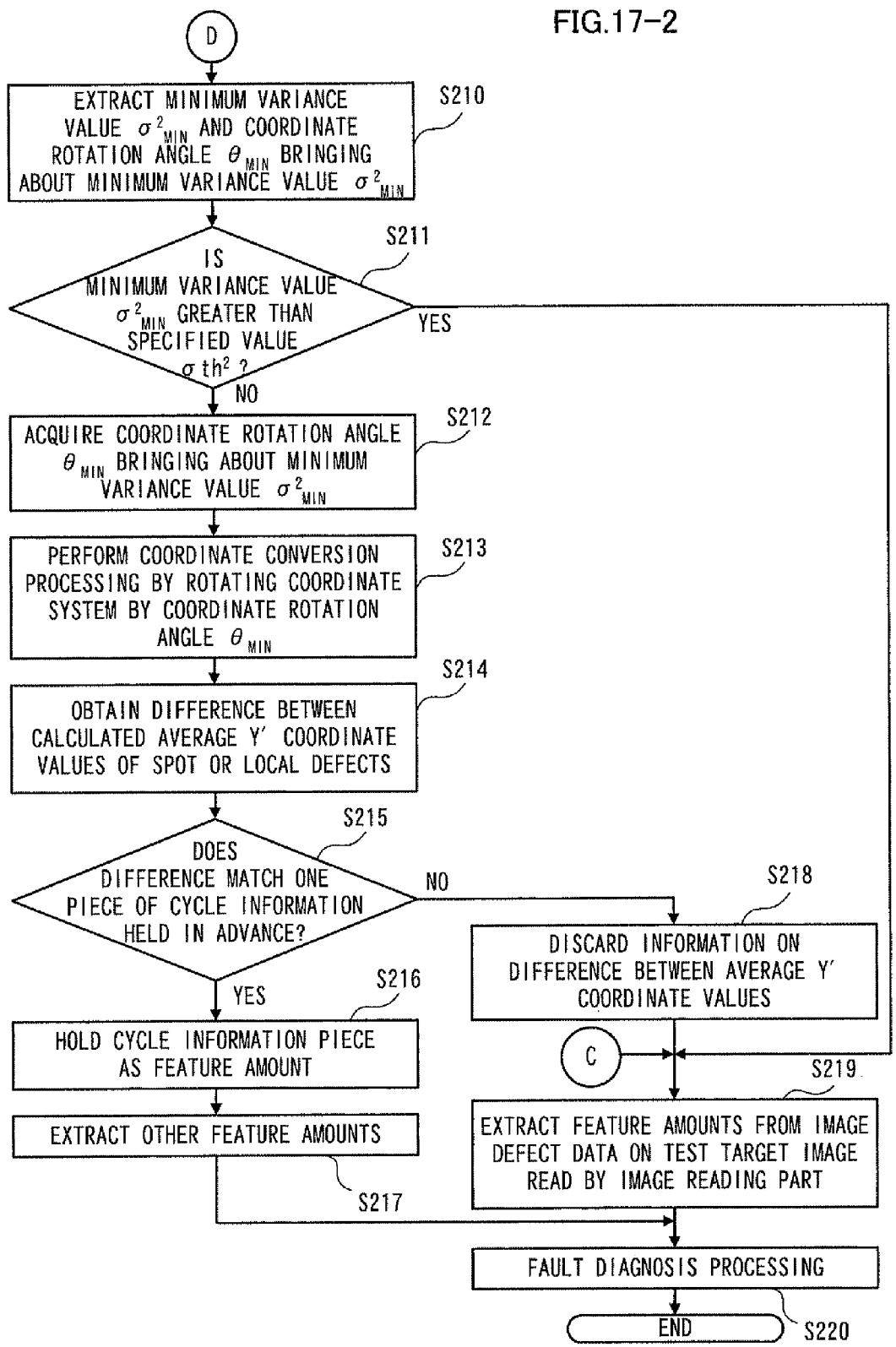

FIGS. 17-1 and 17-2 are flowcharts for explaining an example of the fault diagnosis processing performed by the fault diagnostic unit 20.

Firstly, as shown in FIG. 17-1, the fault diagnostic unit 20 acquires, at the image data acquiring portion 21, image data on a test chart image (test target image) from the image reading part 60, and then stores the image data in the image data storage 22 (Step 201).

The image defect detector 23 of the fault diagnostic unit 20 acquires the image data from the image data storage 22, compares the image data on the test chart image with the reference image data acquired from the external storage 30, and then extracts regions each including an image defect (image defect regions) (Step 202).

The inclination processor 24 of the fault diagnostic unit 20 calculates the area of each of the image defect regions from the "image defect data" associating the image data on the corresponding region judged as an image defect (image defect region) and the position coordinate information on the test chart image (position coordinate data) with each other, and compares the area with the predetermined specified area value (Step 203). Then, if the area of the image defect region is greater than a specified area value (for example, the above-described "first specified area value") (Yes in Step 203), the inclination processor 24 judges that the image defect is not a fine image defect or a locally-occurring image defect (spot or local defect). Moreover, the feature amount extracting portion 25 of the fault diagnostic unit 20 extracts various feature amounts characterizing the image defect from the image defect data on the test chart image (test target image) read by the image reading part 60 (acquired from the image defect detector 23) (Step 219).

By contrast, if the area of the image defect region is not greater than the specified area value (for example, the above-described "first specified area value") (No in Step 203), the inclination processor 24 judges that the image defect is a spot or local defect. Then, the inclination processor 24 of the fault diagnostic unit 20 performs the coordinate conversion processing on the image defect data acquired from the image defect detector 23.

Firstly, the inclination processor 24 sets the coordinate rotation angle θ to be θ=0° for the coordinate conversion processing to be performed on the coordinate system (X-Y coordinate system) of the test chart image by using the rotation center coordinates C as the center (Step 204). Then, the inclination processor 24 obtains a projection distribution waveform of the spot or local defects on the X (X') coordinate axis at the coordinate rotation angle θ=0° (Step 205). Specifically, the inclination processor 24 obtains the total numbers of pixels forming the spot or local defects at the respective X coordinate values on the coordinate system at the coordinate rotation angle θ=0°. Moreover, the inclination processor 24 calculates a variance value $\sigma^2$ of the projection distribution waveform of the spot or local defects (the total numbers of the pixels, forming the spot or local defects, at the respective X (X') coordinate values) existing on the test chart image (Step 206).

The inclination processor 24 generates and stores the correspondence relationship (θ, $\sigma^2$) associating the coordinate rotation angle θ of each coordinate system used in the coordinate conversion processing (θ=0°, here) and the variance value $\sigma^2$ of the spot or local defects on the coordinate system (Step 207).

Subsequently, the inclination processor 24 adds the specific angle δθ to the coordinate rotation angle θ, and thereby sets a new coordinate rotation angle θ (Step 208). Then, the inclination processor 24 judges whether or not the newly-set coordinate rotation angle θ is within the predetermined angle range (Step 209).

If the newly-set coordinate rotation angle θ is within the predetermined angle range (Yes in Step 209), the processing returns to Step 205, and the inclination processor 24 performs the Steps 205 to 208 of the processing by using the newly-set coordinate rotation angle θ.

If the newly-set coordinate rotation angle θ exceeds the predetermined angle range (No in Step 209), the coordinate conversion processing is terminated.

Next, the processing advances to the flowchart in FIG. 17-2. The second judging portion 243 of the inclination processor 24 extracts the minimum value of the variance value $\sigma^2$ of the spot or local defects (minimum variance value $\sigma^2_{MIN}$) and the coordinate rotation angle θ (=$\theta_{MIN}$) of the coordinate system bringing about the minimum variance value $\sigma^2_{MIN}$, from the correspondence relationships (θ, $\sigma^2$) between the coordinate rotation angles θ of the coordinate systems and the variance values $\sigma^2$ of the spot or local defects on the coordinate systems (Step 210).

Then, the second judging portion 243 compares the extracted minimum variance value $\sigma^2_{MIN}$ of the spot or local defects with the predetermined specified value $\sigma th^2$ for the variance values $\sigma^2$ (Step 211). If the minimum variance value $\sigma^2_{MIN}$ is greater than the specified value $\sigma th^2$ (Yes in Step 211), the second judging portion 243 judges that the spot or local defects are occurring randomly, and the feature amount extracting portion 25 of the fault diagnostic unit 20 extracts various feature amounts characterizing the image defects, from the image defect data on the test chart image (test target image) read by the image reading part 60 (acquired from the image defect detector 23) (Step 219).

By contrast, if the minimum variance value $\sigma^2_{MIN}$ is not greater than the specified value $\sigma th^2$ (No in Step 211), the second judging portion 243 judges that the spot or local defects are occurring directionally or periodically.

As a result of the judgment, the rotation processor 244 of the inclination processor 24 acquires, from the second judging portion 243, data on the coordinate rotation angle $\theta_{MIN}$ bringing about the minimum variance value $\sigma^2_{MIN}$ of the spot or local defects (Step 212). Then, the rotation processor 244 sets, as the rotation center coordinates C, one point on the test chart image from which the image defect data is extracted, and performs the coordinate conversion processing on the position coordinate data of the image defect data on the test chart image by rotating the coordinate system by the coordinate rotation angle $\theta_{MIN}$ (Step 213).

The cycle information extracting portion 245 of the inclination processor 24 calculates average values of Y' coordinate values (average Y' coordinate values) of each of the spot or local defects in the image defect data on the new coordinate system obtained by rotating the coordinate system by the coordinate rotation angle $\theta_{MIN}$, and obtains difference between the calculated average Y' coordinate values of the spot or local defects (Step 214).

The cycle information extracting portion 245 compares the difference between the calculated average Y' coordinate values of the spot or local defects with the cycle information held in advance (Step 215). As a result, if the difference matches one piece of the cycle information (Yes in Step 215), the cycle information extracting portion 245 holds the cycle information piece as a "feature amount of the cycle of the image defects" (Step 216). The feature amount of the cycle of the image defects is outputted to the feature amount extracting portion 25 together with the image defect data on the new coordinate system obtained by rotating the coordinate system by the coordinate rotation angle $\theta_{MIN}$.

The feature amount extracting portion 25 extracts feature amounts, other than the feature amount of the cycle of the image defects, characterizing the image defects, on the basis of the image defect data acquired from the inclination processor 24 (Step 217).

By contrast, as a result of the comparison, if the difference does not match any one piece of the cycle information (No in Step 215), the cycle information extracting portion 245 discards the information on the difference between the calculated average Y' coordinate values of the spot or local defects (Step 218).

Then, the feature amount extracting portion 25 extracts various feature amounts characterizing the image defects, from the image defect data on the test chart image (test target image) read by the image reading part 60 (acquired from the image defect detector 23) (Step 219).

Thereafter, the feature amounts extracted by the feature amount extracting portion 25 are transferred to the defect type judging portion 26 and the diagnostic portion 27, and the fault diagnosis processing for diagnosing a fault cause bringing about the image defects is performed (Step 220).

As described above, the fault diagnostic unit 20 of the image forming apparatus 1 of the exemplary embodiments judges whether or not the test chart image read by the image reading part 60 is inclined. When judging that the test chart image is inclined, the fault diagnostic unit 20 corrects the inclination and then extracts feature amounts. Further, the fault diagnostic unit 20 corrects the inclination and then judges whether or not the image defects have a periodicity. When judging that the image defects have a periodicity, the fault diagnostic unit 20 extracts a feature amount of the periodicity of the image defects. This improves the accuracy in detecting image defects occurring in an image formed by the image forming apparatus 1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image defect diagnostic system comprising:
an acquiring unit that acquires image data generated by reading a test target image to be tested for an image defect;
an image defect detecting unit that detects image defects occurring in the test target image, from the image data acquired by the acquiring unit;
a coordinate conversion processor that performs coordinate conversion processing to convert position coordinate information on the image defects detected by the image defect detecting unit into position coordinate information on the image defects in each coordinate system obtained by rotating a coordinate system for the test target image by every predetermined angle by using a coordinate point set in advance in the test target image as rotation center coordinates, the position coordinate information being information on position coordinates in the test target image;
an occurrence state detecting unit that detects an occurrence state of the image defects in each coordinate system, by using the position coordinate information in each coordinate system obtained by rotating the coordinate system for the test target image by every predetermined angle in the coordinate conversion processing performed by the coordinate conversion processor;
a setting unit that sets a coordinate rotation angle for the coordinate conversion processing to be performed on the position coordinate information on the image defects, on the basis of the occurrence state of the image defects detected in each coordinate system by the occurrence state detecting unit; and
a feature amount extracting unit that extracts a feature amount characterizing the image defects, by using the position coordinate information in a coordinate system obtained by rotating the coordinate system for the test target image by the coordinate rotation angle set by the setting unit.

2. The image defect diagnostic system according to claim 1, wherein the occurrence state detecting unit calculates a variation amount of the image defects, the variation amount indicating how much the image defects vary in position in a first scan direction of the test target image in each coordinate system, and detects the occurrence state of the image defects on the basis of the variation amount thus calculated.

3. The image defect diagnostic system according to claim 2, wherein the occurrence state detecting unit obtains position coordinates of each of barycenters of the respective image defects in each coordinate system, and calculates the variation amount in each coordinate system, from positions of the barycenters of the respective image defects in the first scan direction of the test target image.

4. The image defect diagnostic system according to claim 2, wherein the occurrence state detecting unit obtains a variance, in position in the first scan direction in the test target image, of pixels forming the image defects, in each coordinate system, and calculates the variation amount in each coordinate system from the variance.

5. The image defect diagnostic system according to claim 2, wherein, when the variation amount detected by the occurrence state detecting unit is not greater than a specified value set in advance, the setting unit sets the coordinate rotation angle for the coordinate conversion processing to be performed on the position coordinate information on the image defects.

6. The image defect diagnostic system according to claim 1, wherein the feature amount extracting unit extracts the feature amount of periodicity in which the image defects are located at certain intervals in a second scan direction of the test target image.

7. The image defect diagnostic system according to claim 1, further comprising a judging unit that calculates an area of each of the image defects detected by the image defect detecting unit, and judges an image defect having the area not greater than a predetermined specified value, as a test target.

8. An image forming apparatus comprising:
an image forming unit that forms a test target image to be tested for an image defect on a recording medium;
an image reading unit that generates image data for the test target image by reading the test target image formed by the image forming unit; and
an image defect diagnostic unit that extracts a feature amount characterizing image defects occurring in the test target image, by using the image data generated by the image reading unit, and diagnoses a fault cause of the image forming apparatus by using the feature amount, wherein
the image defect diagnostic unit includes:
an acquiring unit that acquires the image data from the image reading unit;
an image defect detecting unit that detects the image defects occurring in the test target image, from the image data acquired by the acquiring unit;
a coordinate conversion processor that performs coordinate conversion processing to convert position coordinate information on the image defects detected by the image defect detecting unit into position coordinate information on the image defects in each coordinate system obtained by rotating a coordinate system for the test target image by every predetermined angle by using a coordinate point set in advance in the test target image as rotation center coordinates, the position coordinate information being information on position coordinates in the test target image;
an occurrence state detecting unit that detects an occurrence state of the image defects in each coordinate system, by using the position coordinate information in each coordinate system obtained by rotating the coordinate system for the test target image by every predetermined angle in the coordinate conversion processing performed by the coordinate conversion processor;
a setting unit that sets a coordinate rotation angle for the coordinate conversion processing to be performed on the position coordinate information on the image defects, on the basis of the occurrence state of the image defects detected in each coordinate system by the occurrence state detecting unit; and
a feature amount extracting unit that extracts the feature amount characterizing the image defects, by using the position coordinate information in a coordinate system obtained by rotating the coordinate system for the test target image by the coordinate rotation angle set by the setting unit.

9. The image forming apparatus according to claim 8, wherein the occurrence state detecting unit of the image defect diagnostic unit calculates a variation amount of the image defects, the variation amount indicating how much the image defects vary in position in a first scan direction of the test target image in each coordinate system, and detects the occurrence state of the image defects on the basis of the variation amount thus calculated.

10. The image forming apparatus according to claim 9, wherein the occurrence state detecting unit of the image defect diagnostic unit obtains position coordinates of each of barycenters of the respective image defects in each coordinate system, and calculates the variation amount in each coordinate system, from positions of the barycenters of the respective image defects in the first scan direction of the test target image.

11. The image forming apparatus according to claim 9, wherein the occurrence state detecting unit of the image defect diagnostic unit obtains a variance, in position in the first scan direction in the test target image, of pixels forming the image defects, in each coordinate system, and calculates the variation amount in each coordinate system from the variance.

12. The image forming apparatus according to claim 8, wherein the feature amount extracting unit of the image defect diagnostic unit extracts the feature amount of periodicity in which the image defects are located at certain intervals in a second scan direction of the test target image.

13. An image defect diagnostic method comprising:
acquiring image data generated by reading a test target image to be tested for an image defect;
detecting image defects occurring in the test target image, from the image data thus acquired;
performing coordinate conversion processing using a coordinate conversion processor, to convert position coordinate information on the image defects into position coordinate information on the image defects in each coordinate system obtained by rotating a coordinate system for the test target image by every predetermined angle by using a coordinate point set in advance in the test target image as rotation center coordinates, the position coordinate information being information on position coordinates in the test target image;
detecting an occurrence state of the image defects in each coordinate system, by using the position coordinate information in each coordinate system obtained by rotating the coordinate system for the test target image by every predetermined angle in the coordinate conversion processing;
setting a coordinate rotation angle for the coordinate conversion processing to be performed on the position coordinate information on the image defects, on the basis of the occurrence state of the image defects in each coordinate system; and
extracting a feature amount characterizing the image defects, by using the position coordinate information in a coordinate system obtained by rotating the coordinate system for the test target image by the coordinate rotation angle.

14. A non-transitory computer readable medium storing a program causing a computer to execute a process for improving accuracy in detecting image defects, the process comprising:
acquiring image data generated by reading a test target image to be tested for an image defect;
detecting image defects occurring in the test target image, from the image data thus acquired;
performing coordinate conversion processing to convert position coordinate information on the image defects into position coordinate information on the image defects in each coordinate system obtained by rotating a coordinate system for the test target image by every predetermined angle by using a coordinate point set in advance in the test target image as rotation center coordinates, the position coordinate information being information on position coordinates in the test target image;
detecting an occurrence state of the image defects in each coordinate system, by using the position coordinate information in each coordinate system obtained by rotating the coordinate system for the test target image by every predetermined angle in the coordinate conversion processing;
setting a coordinate rotation angle for the coordinate conversion processing to be performed on the position coordinate information on the image defects, on the basis of the occurrence state of the image defects in each coordinate system; and
extracting a feature amount characterizing the image defects, by using the position coordinate information in a coordinate system obtained by rotating the coordinate system for the test target image by the coordinate rotation angle.

15. The non-transitory computer readable medium storing a program according to claim 14, wherein detecting the occurrence state of the image defects includes calculating a variation amount of the image defects, the variation amount indicating how much the image defects vary in position in a first scan direction of the test target image in each coordinate system, and detecting the occurrence state of the image defects on the basis of the variation amount thus calculated.

16. The non-transitory computer readable medium storing a program according to claim 14, further comprising extracting the feature amount of periodicity in which the image defects are located at certain intervals in a second scan direction of the test target image.

* * * * *